(12) United States Patent
Jung et al.

(10) Patent No.: US 11,551,263 B2
(45) Date of Patent: Jan. 10, 2023

(54) ACTIVATING DISPLAY AND PERFORMING ADDITIONAL FUNCTION IN MOBILE TERMINAL WITH ONE-TIME USER INPUT

(71) Applicant: FIRSTFACE CO., LTD., Seoul (KR)

(72) Inventors: Jae Lark Jung, Goyang-si (KR); Kyoung duck Bae, Seoul (KR)

(73) Assignee: Firstface Co., Ltd., Seoul (KR)

( * ) Notice: Subject to any disclaimer, the term of this patent is extended or adjusted under 35 U.S.C. 154(b) by 0 days.

(21) Appl. No.: 17/122,273

(22) Filed: Dec. 15, 2020

(65) Prior Publication Data

US 2021/0097575 A1 Apr. 1, 2021

Related U.S. Application Data

(63) Continuation of application No. 16/697,068, filed on Nov. 26, 2019, now Pat. No. 10,896,442, which is a
(Continued)

(30) Foreign Application Priority Data

Oct. 19, 2011 (KR) ........................ 10-2011-0106839

(51) Int. Cl.
*H04W 12/06* (2021.01)
*G06V 40/12* (2022.01)
(Continued)

(52) U.S. Cl.
CPC ..... *G06Q 30/0262* (2013.01); *G06F 3/04883* (2013.01); *G06F 21/32* (2013.01);
(Continued)

(58) Field of Classification Search
CPC .......... G06Q 30/0262; G06Q 30/0241; G06Q 30/0261; G06Q 30/0267; G06Q 30/0269;
(Continued)

(56) References Cited

U.S. PATENT DOCUMENTS

| 4,641,236 A | 2/1987 | Brooks |
| 4,825,143 A | 4/1989 | Cheng |

(Continued)

FOREIGN PATENT DOCUMENTS

| CN | 1095498 A | 11/1994 |
| CN | 1100215 A | 3/1995 |

(Continued)

OTHER PUBLICATIONS

First Office Action dated Oct. 8, 2016 of corresponding Chinese Patent Application No. 201410377402.3—15 pages.
(Continued)

*Primary Examiner* — Techane Gergiso
(74) *Attorney, Agent, or Firm* — Knobbe, Martens, Olson & Bear, LLP

(57) ABSTRACT

A mobile terminal includes a touch screen display, a camera, a power button and an activation button for turning on the touch screen display. The mobile terminal has a first function and a second function to perform in response to user input and provides user settings for configuring at least one of the first and second functions such that the at least one of the first and second functions is performed along with turning on the touch screen display when pressing of the activation button is detected while the touch screen display is turned off. The mobile terminal is configured to perform the first and second functions depending upon length of pressing of the activation button in addition to turning on the touch screen display.

6 Claims, 5 Drawing Sheets

Related U.S. Application Data continuation of application No. 15/938,702, filed on Mar. 28, 2018, now Pat. No. 10,510,097, which is a continuation of application No. 15/859,221, filed on Dec. 29, 2017, now Pat. No. 9,978,082, which is a continuation of application No. 15/013,951, filed on Feb. 2, 2016, now Pat. No. 9,959,555, which is a continuation of application No. 14/848,156, filed on Sep. 8, 2015, now Pat. No. 9,633,373, which is a continuation of application No. 14/538,880, filed on Nov. 12, 2014, now Pat. No. 9,179,298, which is a continuation of application No. 14/058,761, filed on Oct. 21, 2013, now Pat. No. 8,918,074, which is a continuation of application No. 13/590,483, filed on Aug. 21, 2012, now Pat. No. 8,831,557.

(51) Int. Cl.

| | | |
|---|---|---|
| *G06V 40/16* | (2022.01) | |
| *G06V 40/18* | (2022.01) | |
| *H04W 12/08* | (2021.01) | |
| *G06F 21/62* | (2013.01) | |
| *H04W 88/02* | (2009.01) | |
| *G06Q 30/02* | (2012.01) | |
| *G06F 21/32* | (2013.01) | |
| *H04W 52/02* | (2009.01) | |
| *H04M 1/67* | (2006.01) | |
| *H04M 1/724* | (2021.01) | |
| *H04M 1/72466* | (2021.01) | |
| *H04W 8/22* | (2009.01) | |
| *G06F 3/04883* | (2022.01) | |
| *H04L 9/40* | (2022.01) | |
| *G06F 21/36* | (2013.01) | |
| *H04W 4/90* | (2018.01) | |
| *H04W 12/63* | (2021.01) | |

(52) U.S. Cl.
CPC .............. *G06F 21/36* (2013.01); *G06F 21/62* (2013.01); *G06Q 30/0241* (2013.01); *G06Q 30/0261* (2013.01); *G06Q 30/0267* (2013.01); *G06Q 30/0269* (2013.01); *G06V 40/12* (2022.01); *G06V 40/1365* (2022.01); *G06V 40/16* (2022.01); *G06V 40/18* (2022.01); *H04L 63/0861* (2013.01); *H04M 1/67* (2013.01); *H04M 1/724* (2021.01); *H04M 1/72466* (2021.01); *H04W 8/22* (2013.01); *H04W 12/06* (2013.01); *H04W 12/08* (2013.01); *H04W 52/027* (2013.01); *H04W 4/90* (2018.02); *H04W 12/63* (2021.01); *H04W 88/02* (2013.01); *Y02B 70/30* (2013.01); *Y02D 30/70* (2020.08)

(58) Field of Classification Search
CPC .. G06Q 30/02; H04M 1/72466; H04M 1/724; H04M 1/67; H04M 1/72; H04M 2250/12; G06F 3/04883; G06F 21/32; G06F 21/36; G06F 21/62; G06F 3/04; G06F 9/44; G06K 9/00006; G06K 9/00087; G06K 9/00221; G06K 9/00597; H04L 63/0861; H04W 8/22; H04W 12/06; H04W 12/08; H04W 52/027; H04W 4/90; H04W 12/63; H04W 88/02; H04W 52/02; H04W 4/02; H04W 4/22; Y02D 30/70; Y02B 70/30; H04B 1/38; H04B 1/40
See application file for complete search history.

(56) References Cited

U.S. PATENT DOCUMENTS

| | | |
|---|---|---|
| 5,390,005 A | 2/1995 | Kimoto et al. |
| 5,420,936 A | 5/1995 | Fitzpatrick et al. |
| 5,497,149 A | 3/1996 | Fast |
| 5,621,402 A | 4/1997 | Spak et al. |
| 5,845,136 A | 12/1998 | Babcock |
| 5,946,647 A | 8/1999 | Miller et al. |
| 5,982,894 A | 11/1999 | McCalley et al. |
| 5,986,358 A | 11/1999 | Hsieh |
| 6,021,211 A | 2/2000 | Setlak et al. |
| 6,047,281 A | 4/2000 | Wilson et al. |
| 6,047,282 A | 4/2000 | Wilson et al. |
| 6,067,368 A | 5/2000 | Setlak et al. |
| 6,069,970 A | 5/2000 | Salatino et al. |
| 6,070,159 A | 5/2000 | Wilson et al. |
| 6,088,471 A | 7/2000 | Setlak et al. |
| 6,088,585 A | 7/2000 | Schmitt et al. |
| 6,091,031 A | 7/2000 | Lee et al. |
| 6,098,330 A | 8/2000 | Schmitt et al. |
| 6,118,435 A | 9/2000 | Fujita et al. |
| 6,167,000 A | 12/2000 | Chow |
| 6,181,807 B1 | 1/2001 | Setlak et al. |
| 6,191,504 B1 | 2/2001 | Kawata et al. |
| 6,193,153 B1 | 2/2001 | Lambert |
| 6,424,274 B1 | 7/2002 | Schnizlein et al. |
| 6,466,781 B1 | 10/2002 | Bromba et al. |
| 6,476,797 B1 | 11/2002 | Kurihara et al. |
| 6,483,500 B1 | 11/2002 | Choi et al. |
| 6,522,893 B1 | 2/2003 | Han et al. |
| 6,532,298 B1 | 3/2003 | Cambier et al. |
| 6,542,624 B1 | 4/2003 | Oda |
| 6,556,185 B2 | 4/2003 | Rekimoto |
| 6,567,068 B2 | 5/2003 | Rekimoto |
| 6,628,812 B1 | 9/2003 | Setlak et al. |
| 6,636,732 B1 | 10/2003 | Boling et al. |
| 6,667,439 B2 | 12/2003 | Salatino et al. |
| 6,683,971 B1 | 1/2004 | Salatino et al. |
| 6,703,919 B2 | 3/2004 | Baset |
| 6,750,803 B2 | 6/2004 | Yates et al. |
| 6,757,001 B2 | 6/2004 | Allport |
| 6,788,928 B2 | 9/2004 | Kohinata |
| 6,792,287 B1 | 9/2004 | Tuomela et al. |
| 6,795,569 B1 | 9/2004 | Setlak |
| 6,819,219 B1 | 11/2004 | Bolle et al. |
| 6,853,308 B1 | 2/2005 | Dustin |
| 6,892,081 B1 | 5/2005 | Elomaa |
| 6,919,522 B2 | 7/2005 | Uehira |
| 6,950,541 B1 | 9/2005 | Setlak et al. |
| 7,002,554 B2 | 2/2006 | Numano et al. |
| 7,076,089 B2 | 4/2006 | Brandt et al. |
| 7,049,166 B2 | 5/2006 | Salatino et al. |
| 7,068,254 B2 | 6/2006 | Yamazaki et al. |
| 7,124,300 B1 | 10/2006 | Lemke |
| 7,154,453 B2 | 12/2006 | Numano |
| 7,162,059 B2 | 1/2007 | Yoo et al. |
| 7,173,813 B2 | 2/2007 | Wu |
| 7,214,953 B2 | 5/2007 | Setlak et al. |
| 7,239,728 B1 | 7/2007 | Choi et al. |
| 7,251,478 B2 | 7/2007 | Cortegiano |
| 7,280,677 B2 | 10/2007 | Chandler et al. |
| 7,315,233 B2 | 1/2008 | Yuhara |
| 7,321,701 B2 | 1/2008 | Setlak et al. |
| D563,252 S | 3/2008 | Minta |
| 7,339,581 B2 | 3/2008 | Katayose |
| 7,345,679 B2 | 3/2008 | Katayose |
| 7,348,511 B2 | 3/2008 | Chen et al. |
| 7,351,974 B2 | 4/2008 | Setlak |
| 7,358,515 B2 | 4/2008 | Setlak et al. |
| 7,361,919 B2 | 4/2008 | Setlak |
| 7,362,221 B2 | 4/2008 | Katz |
| 7,362,306 B2 | 4/2008 | Shibazaki et al. |
| 7,424,136 B2 | 9/2008 | Setlak et al. |
| 7,424,740 B2 | 9/2008 | Bear et al. |
| 7,453,443 B2 | 11/2008 | Rytivaara et al. |
| 7,525,594 B2 | 4/2009 | Tatamiya et al. |
| 7,555,728 B2 | 6/2009 | Esaki et al. |

(56) References Cited

U.S. PATENT DOCUMENTS

| | | | |
|---|---|---|---|
| 7,587,072 B2 | 9/2009 | Russo et al. |
| 7,599,530 B2 | 10/2009 | Boshra |
| 7,599,532 B2 | 10/2009 | Setlak et al. |
| 7,613,446 B2 | 11/2009 | Engstrom et al. |
| 7,616,786 B2 | 11/2009 | Setlak |
| 7,616,787 B2 | 11/2009 | Boshra |
| 7,623,847 B2 | 11/2009 | Yamashita et al. |
| 7,629,871 B2 | 12/2009 | Schrum et al. |
| 7,647,638 B2 * | 1/2010 | Furuyama | G06F 21/32 |
| | | | 726/26 |
| 7,657,849 B2 | 2/2010 | Chaudhri et al. |
| 7,668,829 B2 | 2/2010 | Chu et al. |
| 7,671,351 B2 | 3/2010 | Setlak et al. |
| 7,677,978 B2 | 3/2010 | Tawara |
| 7,679,221 B2 | 3/2010 | Kimoto et al. |
| 7,684,953 B2 | 3/2010 | Feist et al. |
| 7,688,314 B2 | 3/2010 | Abdallah et al. |
| 7,689,012 B2 | 3/2010 | Neil et al. |
| 7,693,314 B2 | 4/2010 | Tykowski et al. |
| 7,697,729 B2 | 4/2010 | Howell et al. |
| 7,721,227 B2 | 5/2010 | Ronkainen |
| 7,725,511 B2 | 5/2010 | Kadi |
| 7,728,812 B2 | 6/2010 | Sata et al. |
| 7,734,074 B2 | 6/2010 | Setlak et al. |
| 7,738,916 B2 | 6/2010 | Fukuda |
| 7,751,595 B2 | 7/2010 | Russo |
| 7,787,667 B2 | 8/2010 | Boshra |
| 7,788,799 B2 | 9/2010 | Schrum et al. |
| 7,817,143 B2 | 10/2010 | Soh et al. |
| 7,826,792 B2 | 11/2010 | Morita et al. |
| 7,830,651 B2 | 11/2010 | Lee |
| 7,831,070 B1 | 11/2010 | Cheng et al. |
| 7,858,891 B2 | 12/2010 | Strohband et al. |
| 7,874,488 B2 | 1/2011 | Parkinson |
| 7,885,436 B2 | 2/2011 | Russo et al. |
| 7,894,643 B2 | 2/2011 | Setlak et al. |
| 7,912,256 B2 | 3/2011 | Russo |
| 7,915,601 B2 | 3/2011 | Setlak et al. |
| 7,917,180 B2 | 3/2011 | Rochford |
| 7,920,126 B2 | 4/2011 | Prados et al. |
| 7,940,249 B2 | 5/2011 | Perreault |
| 7,952,463 B2 | 5/2011 | Terao |
| 7,956,792 B2 | 6/2011 | Chen et al. |
| 7,969,424 B2 | 6/2011 | Yokota |
| 7,986,945 B2 | 7/2011 | Yuki et al. |
| 8,006,099 B2 | 8/2011 | Aoyama et al. |
| 8,009,412 B2 | 8/2011 | Chen |
| 8,019,131 B2 | 9/2011 | Wong et al. |
| 8,031,046 B2 | 10/2011 | Franza et al. |
| 8,050,720 B2 | 11/2011 | Tsui |
| 8,068,099 B2 * | 11/2011 | Hsu | H04M 1/67 |
| | | | 345/173 |
| 8,073,204 B2 | 12/2011 | Kramer et al. |
| 8,073,569 B2 | 12/2011 | Decrooix et al. |
| 8,074,878 B1 | 12/2011 | Daniel |
| 8,081,805 B2 | 12/2011 | Neil |
| 8,082,522 B2 | 12/2011 | Kinouchi |
| 8,085,998 B2 | 12/2011 | Setlak et al. |
| D652,332 S | 1/2012 | Bond et al. |
| D652,333 S | 1/2012 | Bond et al. |
| 8,115,497 B2 | 2/2012 | Gozzini |
| 8,127,254 B2 | 2/2012 | Lindberg et al. |
| 8,134,475 B2 | 3/2012 | R. |
| 8,134,648 B2 | 3/2012 | Kendall |
| 8,138,811 B2 | 3/2012 | Liao et al. |
| 8,138,886 B1 | 3/2012 | Chang |
| 8,144,120 B2 | 3/2012 | Vassigh et al. |
| 8,145,916 B2 | 3/2012 | Boshra et al. |
| 8,149,089 B2 | 4/2012 | Lin et al. |
| 8,155,635 B2 | 4/2012 | Hsieh et al. |
| 8,159,324 B2 | 4/2012 | Zellweger et al. |
| 8,160,562 B2 | 4/2012 | Yuki et al. |
| 8,165,355 B2 | 4/2012 | Benkley et al. |
| 8,171,907 B2 | 5/2012 | Koenen et al. |
| 8,180,118 B2 | 5/2012 | Neil et al. |
| 8,180,120 B2 | 5/2012 | Hook |
| 8,188,975 B2 | 5/2012 | Jung |
| 8,219,913 B2 | 7/2012 | Terada |
| 8,223,126 B2 | 7/2012 | Hokkanen |
| 8,231,056 B2 | 7/2012 | Zabroda et al. |
| 8,231,394 B2 | 7/2012 | Takao |
| 8,250,387 B2 | 8/2012 | Tsukamoto et al. |
| 8,265,607 B2 | 9/2012 | Wormald et al. |
| 8,275,178 B2 | 9/2012 | Boshra |
| 8,279,182 B2 | 10/2012 | Kim et al. |
| 8,286,103 B2 | 10/2012 | Chaudhri et al. |
| 8,299,889 B2 | 10/2012 | Kumar et al. |
| 8,308,382 B2 | 11/2012 | Soumi |
| 8,310,449 B1 | 11/2012 | Butikofer |
| 8,311,514 B2 | 11/2012 | Bandyopadhyay |
| 8,311,575 B2 | 11/2012 | Li et al. |
| 8,351,893 B2 | 1/2013 | Ylitalo |
| 8,358,816 B2 | 1/2013 | Sherlock et al. |
| 8,471,679 B2 | 1/2013 | Stewart |
| 8,369,721 B2 | 2/2013 | Yamada |
| 8,378,508 B2 | 2/2013 | Bond et al. |
| 8,385,885 B2 | 2/2013 | Hainzl |
| 8,400,107 B2 | 3/2013 | Taguchi et al. |
| 8,412,158 B2 | 4/2013 | Forutanpour et al. |
| 8,432,252 B2 | 4/2013 | Setlak et al. |
| 8,438,400 B2 | 5/2013 | Hoghaug et al. |
| 8,443,199 B2 | 5/2013 | Kim et al. |
| 8,455,777 B2 | 6/2013 | Enoch |
| 8,455,961 B2 | 6/2013 | Setlak et al. |
| 8,458,485 B2 | 6/2013 | Bandyopadhyay et al. |
| 8,471,345 B2 | 6/2013 | Bond et al. |
| 8,487,883 B2 | 7/2013 | Kao et al. |
| 8,493,352 B2 | 7/2013 | Koya |
| 8,508,340 B2 | 8/2013 | Sanchez et al. |
| 8,508,487 B2 | 8/2013 | Schwesig et al. |
| 8,516,557 B2 | 8/2013 | Jin |
| 8,536,472 B2 | 9/2013 | Wu et al. |
| 8,538,370 B2 | 9/2013 | Ray et al. |
| 8,539,382 B2 | 9/2013 | Lyon et al. |
| 8,542,214 B2 | 9/2013 | Nakai et al. |
| 8,547,466 B2 | 10/2013 | Chao |
| 8,548,206 B2 | 10/2013 | Sahin et al. |
| 8,560,020 B2 | 10/2013 | Lee |
| 8,569,875 B2 | 10/2013 | Bond et al. |
| 8,571,521 B2 * | 10/2013 | Kim | H04W 12/06 |
| | | | 455/411 |
| 8,581,877 B2 * | 11/2013 | Yoo | G06F 3/04817 |
| | | | 345/174 |
| 8,582,837 B2 | 11/2013 | Bond et al. |
| 8,598,555 B2 | 12/2013 | Guerrero et al. |
| 8,604,905 B2 | 12/2013 | Setlak et al. |
| 8,604,906 B1 * | 12/2013 | Halferty | H04W 12/126 |
| | | | 340/5.83 |
| 8,616,451 B1 | 12/2013 | Rao |
| 8,618,910 B2 | 12/2013 | Setlak et al. |
| 8,621,380 B2 | 12/2013 | Kocienda |
| 8,627,096 B2 | 1/2014 | Azar et al. |
| 8,638,305 B2 | 1/2014 | Inami |
| 8,638,385 B2 | 1/2014 | Bhogal |
| 8,638,994 B2 | 1/2014 | Kraemer et al. |
| 8,643,771 B2 | 2/2014 | You |
| 8,656,486 B2 | 2/2014 | Hicks et al. |
| 8,660,545 B1 | 2/2014 | Redford et al. |
| 8,667,297 B2 | 3/2014 | Salter et al. |
| 8,701,267 B2 | 4/2014 | Goldenberg et al. |
| 8,723,824 B2 * | 5/2014 | Myers | G06F 3/0446 |
| | | | 345/173 |
| 8,736,001 B2 | 5/2014 | Salatino et al. |
| 8,745,490 B2 | 6/2014 | Kim |
| 8,782,775 B2 | 7/2014 | Fadell |
| 8,788,838 B1 | 7/2014 | Fadell et al. |
| 8,793,786 B2 | 7/2014 | Bhesania et al. |
| 8,803,258 B2 | 8/2014 | Gozzini et al. |
| 8,803,811 B2 | 8/2014 | Kondo et al. |
| 8,810,367 B2 | 8/2014 | Mullins |
| 8,811,685 B1 | 8/2014 | Bowers et al. |
| 8,811,948 B2 | 8/2014 | Bandyopadhyay et al. |
| 8,831,295 B2 | 9/2014 | Coons |
| 8,836,478 B2 | 9/2014 | Bond et al. |

(56) References Cited

U.S. PATENT DOCUMENTS

| | | |
|---|---|---|
| 8,836,637 B2 | 9/2014 | Bychkov et al. |
| 8,850,365 B2 | 9/2014 | Cumming |
| 8,866,761 B2 | 10/2014 | Enami |
| 8,888,004 B2 | 11/2014 | Setlak et al. |
| 8,903,141 B2 | 12/2014 | Heilpern |
| 8,912,877 B2 | 12/2014 | Ling et al. |
| 8,918,074 B2 | 12/2014 | Jung et al. |
| 8,932,135 B2 | 1/2015 | Coe |
| 8,943,580 B2 | 1/2015 | Fadell et al. |
| 8,954,887 B1 | 2/2015 | Tseng et al. |
| 8,965,449 B2 | 2/2015 | Alvarez Rivera et al. |
| 8,970,528 B2 | 3/2015 | Kojima et al. |
| 8,971,594 B2 | 3/2015 | Sherlock et al. |
| 8,984,596 B2 | 3/2015 | Griffin |
| 9,013,424 B2 | 4/2015 | Kurz |
| 9,013,613 B2 | 4/2015 | Ogita et al. |
| 9,027,117 B2 | 5/2015 | Wilairat |
| 9,030,679 B2 | 5/2015 | Yoshida et al. |
| 9,038,167 B2 | 5/2015 | Fadell et al. |
| 9,076,008 B1 | 7/2015 | Moy |
| 9,082,235 B2 | 7/2015 | Lau et al. |
| 9,104,288 B2 | 8/2015 | Wever |
| 9,128,601 B2 | 9/2015 | Fadell et al. |
| 9,134,896 B2 | 9/2015 | Fadell et al. |
| 9,179,298 B2 | 11/2015 | Jung et al. |
| 9,229,489 B2 | 1/2016 | Toksvig et al. |
| 9,250,795 B2 | 2/2016 | Fadell et al. |
| 9,261,998 B2 | 2/2016 | Kurokawa et al. |
| 9,274,647 B2 | 3/2016 | Fadell et al. |
| 9,304,624 B2 | 4/2016 | Fadell et al. |
| 9,307,396 B2 | 4/2016 | Jung et al. |
| 9,329,771 B2 | 5/2016 | Fadell et al. |
| 9,338,274 B2 | 5/2016 | Gao et al. |
| 9,355,239 B2 | 5/2016 | Bandyopadhyay et al. |
| 9,448,813 B2 | 9/2016 | Sauve et al. |
| 9,495,531 B2 | 11/2016 | Fadell et al. |
| 9,519,771 B2 | 12/2016 | Fadell et al. |
| 9,521,247 B2 | 12/2016 | Bandyopadhyay et al. |
| 9,542,087 B2 | 1/2017 | Arai |
| 9,606,643 B2 | 3/2017 | Aguera-Arcas et al. |
| 9,633,373 B2 | 4/2017 | Jung et al. |
| 9,684,394 B2 | 6/2017 | Foss et al. |
| 9,703,468 B2 | 7/2017 | Reeves et al. |
| 9,779,419 B2 | 10/2017 | Jung et al. |
| 9,826,077 B2 | 11/2017 | Shim et al. |
| 9,946,891 B2 | 4/2018 | Bandyopadhyay et al. |
| 9,953,152 B2 | 4/2018 | Fadell et al. |
| 9,959,555 B2 | 5/2018 | Jung et al. |
| 9,978,082 B1 | 5/2018 | Jung et al. |
| 10,510,097 B2 | 12/2019 | Jung et al. |
| 10,896,442 B2 | 1/2021 | Jung et al. |
| 2001/0038328 A1 | 11/2001 | King et al. |
| 2001/0048423 A1 | 12/2001 | Rekimoto |
| 2002/0075335 A1 | 6/2002 | Rekimoto |
| 2002/0083329 A1 | 6/2002 | Kiyomoto |
| 2002/0118131 A1 | 8/2002 | Yates et al. |
| 2002/0141549 A1 | 10/2002 | Swanson et al. |
| 2002/0190960 A1 | 12/2002 | Kuo et al. |
| 2003/0018395 A1 | 1/2003 | Crnkovich et al. |
| 2003/0048258 A1 | 3/2003 | Numano et al. |
| 2003/0053665 A1 | 3/2003 | Hamid |
| 2003/0090529 A1 | 5/2003 | Kuo et al. |
| 2003/0098781 A1 | 5/2003 | Baset |
| 2003/0104790 A1 | 6/2003 | Ylitalo |
| 2003/0173408 A1 | 9/2003 | Mosher, Jr. et al. |
| 2004/0004604 A1 | 1/2004 | Numano |
| 2004/0072583 A1 | 4/2004 | Weng |
| 2004/0155752 A1 | 8/2004 | Radke |
| 2004/0183779 A1 | 9/2004 | Shibazaki et al. |
| 2005/0024321 A1 | 2/2005 | Tsai |
| 2005/0037819 A1 | 2/2005 | Naor |
| 2005/0039135 A1 | 2/2005 | Othmer et al. |
| 2005/0108096 A1 | 5/2005 | Burger et al. |
| 2005/0113071 A1 | 5/2005 | Nagata |
| 2005/0034965 A1 | 7/2005 | Uehira |
| 2005/0156904 A1 | 7/2005 | Katayose |
| 2005/0162407 A1 | 7/2005 | Sakurai et al. |
| 2005/0168449 A1 | 8/2005 | Katayose |
| 2005/0181821 A1 | 8/2005 | Elomaa |
| 2005/0207614 A1 | 9/2005 | Schonberg et al. |
| 2005/0212979 A1 | 9/2005 | Morita et al. |
| 2005/0251760 A1 | 11/2005 | Sata et al. |
| 2005/0253817 A1 | 11/2005 | Rytivaara et al. |
| 2006/0008124 A1 | 1/2006 | Ewe et al. |
| 2006/0011045 A1 | 1/2006 | Yamashita et al. |
| 2006/0015407 A1 | 1/2006 | Bernard et al. |
| 2006/0044462 A1 | 3/2006 | Tatamiya et al. |
| 2006/0105814 A1 | 5/2006 | Monden et al. |
| 2006/0107235 A1 | 5/2006 | Esaki et al. |
| 2006/0126280 A1 | 6/2006 | Wu |
| 2006/0140461 A1 | 6/2006 | Kim et al. |
| 2006/0142071 A1 | 6/2006 | Stephens |
| 2006/0146037 A1 | 7/2006 | Prados et al. |
| 2006/0156028 A1 | 7/2006 | Aoyama et al. |
| 2006/0234764 A1 | 10/2006 | Gamo et al. |
| 2006/0239517 A1 | 10/2006 | Creasey et al. |
| 2006/0250377 A1 | 11/2006 | Zadesky et al. |
| 2006/0255907 A1 | 11/2006 | Min |
| 2006/0258289 A1 | 11/2006 | Dua |
| 2006/0274053 A1 | 12/2006 | Kinouchi |
| 2006/0288234 A1 | 12/2006 | Azar et al. |
| 2006/0293925 A1 | 12/2006 | Flom |
| 2007/0009866 A1 | 1/2007 | Marcus et al. |
| 2007/0024595 A1 | 2/2007 | Baker et al. |
| 2007/0033415 A1 | 2/2007 | Yumoto et al. |
| 2007/0052687 A1 | 3/2007 | Terada |
| 2007/0060114 A1 | 3/2007 | Ramer et al. |
| 2007/0100981 A1 | 5/2007 | Adamczyk et al. |
| 2007/0103433 A1 | 5/2007 | Katz |
| 2007/0103450 A1 | 5/2007 | Tank et al. |
| 2007/0136761 A1 | 6/2007 | Basmajian, II et al. |
| 2007/0129046 A1 | 7/2007 | Soh et al. |
| 2007/0171297 A1 | 7/2007 | Namgoong |
| 2007/0187218 A1 | 8/2007 | Chen et al. |
| 2007/0240211 A1 | 10/2007 | Kosaka et al. |
| 2007/0247420 A1 | 10/2007 | Strohband et al. |
| 2007/0247433 A1 | 10/2007 | Li |
| 2007/0249330 A1 | 10/2007 | Cortegiano et al. |
| 2007/0259685 A1 | 11/2007 | Engblom et al. |
| 2007/0273658 A1 | 11/2007 | Yli-Nokari et al. |
| 2007/0290630 A1 | 12/2007 | Kimoto et al. |
| 2007/0293273 A1 | 12/2007 | Rochford |
| 2007/0294725 A1 | 12/2007 | Cohen et al. |
| 2008/0012836 A1 | 1/2008 | Yokota |
| 2008/0024435 A1 | 1/2008 | Dohta |
| 2008/0027813 A1 | 1/2008 | Kogure et al. |
| 2008/0030301 A1 | 2/2008 | Terao |
| 2008/0036739 A1 | 2/2008 | Juh et al. |
| 2008/0042983 A1 | 2/2008 | Kim et al. |
| 2008/0049980 A1 | 2/2008 | Castaneda et al. |
| 2008/0055146 A1 | 3/2008 | Chen et al. |
| 2008/0066610 A1 | 3/2008 | Chu et al. |
| 2008/0070622 A1 | 3/2008 | Lee |
| 2008/0094477 A1 | 4/2008 | Chang |
| 2008/0115208 A1 | 5/2008 | Lee |
| 2008/0126975 A1 | 5/2008 | Vassigh et al. |
| 2008/0133336 A1 | 6/2008 | Altman et al. |
| 2008/0148059 A1 | 6/2008 | Shapiro |
| 2008/0148395 A1 | 6/2008 | Brock |
| 2008/0178280 A1 | 7/2008 | Chen |
| 2008/0180537 A1* | 7/2008 | Weinberg ............ H04N 5/23293 348/E5.029 |
| 2008/0188855 A1 | 8/2008 | Brown et al. |
| 2008/0209547 A1 | 8/2008 | Funahashi et al. |
| 2008/0214150 A1 | 9/2008 | Ramer et al. |
| 2008/0225012 A1 | 9/2008 | Lipovski |
| 2008/0254839 A1 | 10/2008 | Lee |
| 2008/0261659 A1* | 10/2008 | Jang .................... H04M 1/0237 455/566 |
| 2008/0261695 A1 | 10/2008 | Coe |
| 2008/0284754 A1 | 11/2008 | Kao et al. |
| 2008/0309451 A1 | 12/2008 | Zellweger et al. |
| 2009/0006857 A1 | 1/2009 | Cheng |
| 2009/0009482 A1 | 1/2009 | McDermid |

(56) References Cited

U.S. PATENT DOCUMENTS

| | | |
|---|---|---|
| 2009/0012704 A1 | 1/2009 | Franco et al. |
| 2009/0017871 A1 | 1/2009 | Brieskorn |
| 2009/0019400 A1 | 1/2009 | Matsumoto |
| 2009/0037742 A1 | 2/2009 | Narayanaswami |
| 2009/0046076 A1 | 2/2009 | Bychkov et al. |
| 2009/0051657 A1 | 2/2009 | Kim et al. |
| 2009/0082066 A1 | 3/2009 | Katz |
| 2009/0083850 A1 | 3/2009 | Fadell et al. |
| 2009/0109294 A1 | 4/2009 | Cummings et al. |
| 2009/0111435 A1 | 4/2009 | Tsui et al. |
| 2009/0169070 A1 | 7/2009 | Fadell et al. |
| 2009/0181662 A1 | 7/2009 | Fleischman |
| 2009/0194343 A1 | 8/2009 | Soumi |
| 2009/0224874 A1 | 9/2009 | Dewar et al. |
| 2009/0227279 A1 | 9/2009 | Yuki et al. |
| 2009/0232362 A1 | 9/2009 | Otsubo et al. |
| 2009/0239591 A1 | 9/2009 | Alameh et al. |
| 2009/0258667 A1 | 10/2009 | Suzuki et al. |
| 2009/0262078 A1 | 10/2009 | Pizzi |
| 2009/0264157 A1 | 10/2009 | Hsieh |
| 2009/0316347 A1 | 12/2009 | Lee |
| 2009/0319710 A1 | 12/2009 | Liu |
| 2010/0003951 A1 | 1/2010 | Ray et al. |
| 2010/0013772 A1 | 1/2010 | Jung |
| 2010/0017872 A1 | 1/2010 | Goertz et al. |
| 2010/0020020 A1 | 1/2010 | Chen |
| 2010/0038151 A1 | 2/2010 | Chen |
| 2010/0048251 A1 | 2/2010 | Liu |
| 2010/0240415 A1 | 2/2010 | Kim et al. |
| 2010/0079380 A1 | 4/2010 | Nurmi |
| 2010/0079508 A1* | 4/2010 | Hodge .................. G06F 1/3206 345/697 |
| 2010/0097176 A1 | 4/2010 | Sakurai et al. |
| 2010/0099394 A1 | 4/2010 | Hainzl |
| 2010/0102939 A1 | 4/2010 | Stewart |
| 2010/0136811 A1 | 6/2010 | Takao |
| 2010/0138914 A1 | 6/2010 | Davis et al. |
| 2010/0159898 A1 | 6/2010 | Krzyzanowski et al. |
| 2010/0159995 A1 | 6/2010 | Stallings et al. |
| 2010/0164878 A1 | 7/2010 | Bestle et al. |
| 2010/0166442 A1 | 7/2010 | Yamada |
| 2010/0173679 A1 | 7/2010 | Moon |
| 2010/0187023 A1 | 7/2010 | Min |
| 2010/0219056 A1 | 9/2010 | An |
| 2010/0225607 A1 | 9/2010 | Kim |
| 2010/0231384 A1 | 9/2010 | Reams |
| 2010/0237991 A1 | 9/2010 | Prabhu et al. |
| 2010/0257490 A1 | 10/2010 | Lyon et al. |
| 2010/0304731 A1 | 12/2010 | Bratton et al. |
| 2010/0312643 A1 | 12/2010 | Gil |
| 2010/0312946 A1 | 12/2010 | Bold et al. |
| 2010/0331046 A1 | 12/2010 | Li et al. |
| 2011/0004678 A1 | 1/2011 | Rothrock |
| 2011/0047368 A1 | 2/2011 | Sundaramurthy |
| 2011/0057613 A1 | 3/2011 | Taguchi et al. |
| 2011/0069940 A1 | 3/2011 | Shimy et al. |
| 2011/0080260 A1 | 4/2011 | Wang et al. |
| 2011/0081889 A1 | 4/2011 | Gao et al. |
| 2011/0087990 A1 | 4/2011 | Ng et al. |
| 2011/0118961 A1 | 5/2011 | Koenen et al. |
| 2011/0157020 A1 | 6/2011 | Huang et al. |
| 2011/0167375 A1 | 7/2011 | Kocienda |
| 2011/0175703 A1 | 7/2011 | Benkley, III |
| 2011/0187675 A1 | 8/2011 | Nakai et al. |
| 2011/0199637 A1 | 8/2011 | Yoshida et al. |
| 2011/0216023 A1 | 9/2011 | Kurokawa et al. |
| 2011/0227854 A1 | 9/2011 | Koya |
| 2011/0252379 A1 | 10/2011 | Yuki et al. |
| 2011/0253519 A1 | 10/2011 | Enoch |
| 2011/0260971 A1 | 10/2011 | Lin et al. |
| 2011/0298743 A1 | 12/2011 | Machida et al. |
| 2011/0300829 A1 | 12/2011 | Nurmi et al. |
| 2012/0007663 A1 | 1/2012 | Ricca et al. |
| 2012/0009557 A1 | 1/2012 | Marcus et al. |
| 2012/0009896 A1* | 1/2012 | Bandyopadhyay ...... G06F 3/016 715/764 |
| 2012/0019704 A1* | 1/2012 | Levey .............. H04N 5/232411 348/335 |
| 2012/0026098 A1 | 2/2012 | Ladouceur et al. |
| 2012/0044169 A1 | 2/2012 | Enami |
| 2012/0046012 A1 | 2/2012 | Forutanpour et al. |
| 2012/0052836 A1 | 3/2012 | Buratti et al. |
| 2012/0069042 A1 | 3/2012 | Ogita et al. |
| 2012/0069231 A1 | 3/2012 | Chao |
| 2012/0071149 A1* | 3/2012 | Bandyopadhyay ...... H04M 1/67 455/418 |
| 2012/0098639 A1 | 4/2012 | Ijas |
| 2012/0098771 A1 | 4/2012 | Kondo et al. |
| 2012/0105367 A1 | 5/2012 | Son et al. |
| 2012/0127179 A1 | 5/2012 | Aspelin |
| 2012/0133484 A1 | 5/2012 | Griffin |
| 2012/0146898 A1 | 6/2012 | Lin |
| 2012/0159139 A1 | 6/2012 | Kim et al. |
| 2012/0186951 A1 | 7/2012 | Wu et al. |
| 2012/0218231 A1 | 8/2012 | Slaby et al. |
| 2012/0229411 A1 | 9/2012 | Arai |
| 2012/0235790 A1 | 9/2012 | Zhao et al. |
| 2012/0280917 A1 | 11/2012 | Toksvig et al. |
| 2012/0284297 A1* | 11/2012 | Aguera-Arcas ..... G06F 3/03547 707/769 |
| 2012/0287076 A1 | 11/2012 | Dao et al. |
| 2012/0302200 A1 | 11/2012 | Esbensen |
| 2012/0303476 A1 | 11/2012 | Kryzanowski et al. |
| 2012/0311499 A1* | 12/2012 | Dellinger ......... H04N 5/232935 715/835 |
| 2013/0015946 A1 | 1/2013 | Lau et al. |
| 2013/0031619 A1 | 1/2013 | Waltermann et al. |
| 2013/0057385 A1 | 3/2013 | Murakami et al. |
| 2013/0063386 A1 | 3/2013 | Kojima et al. |
| 2013/0063611 A1 | 3/2013 | Papakipos et al. |
| 2013/0069764 A1 | 3/2013 | Wu |
| 2013/0082974 A1 | 4/2013 | Kerr et al. |
| 2013/0091561 A1 | 4/2013 | Bruso et al. |
| 2013/0102273 A1 | 4/2013 | Jung et al. |
| 2013/0102363 A1 | 4/2013 | Jung et al. |
| 2013/0104187 A1 | 4/2013 | Weidner |
| 2013/0127748 A1 | 5/2013 | Vertegaal et al. |
| 2013/0157561 A1 | 6/2013 | Tamai et al. |
| 2013/0162598 A1 | 6/2013 | Lin |
| 2013/0231046 A1 | 9/2013 | Pope et al. |
| 2014/0051382 A1 | 2/2014 | Jung |
| 2014/0112555 A1 | 4/2014 | Fadell |
| 2014/0115694 A1 | 4/2014 | Fadell |
| 2014/0115695 A1 | 4/2014 | Fadell |
| 2014/0115696 A1 | 4/2014 | Fadell |
| 2014/0148218 A1 | 5/2014 | Lin |
| 2014/0162598 A1 | 6/2014 | Villa-Real |
| 2014/0304809 A1 | 10/2014 | Fadell |
| 2014/0310532 A1 | 10/2014 | Ali et al. |
| 2014/0380465 A1 | 12/2014 | Fadell |
| 2015/0051913 A1 | 2/2015 | Choi |
| 2015/0065203 A1 | 3/2015 | Jung et al. |
| 2015/0127965 A1 | 5/2015 | Hong et al. |
| 2015/0133086 A1 | 5/2015 | Pratt et al. |
| 2015/0160780 A1 | 6/2015 | Park |
| 2015/0193116 A1 | 7/2015 | Fadell |
| 2015/0237192 A1 | 8/2015 | Kim et al. |
| 2015/0253894 A1 | 9/2015 | McCulloch et al. |
| 2015/0378595 A1 | 12/2015 | Jung et al. |
| 2015/0381617 A1 | 12/2015 | Jung et al. |
| 2016/0026329 A1 | 1/2016 | Fadell |
| 2016/0154954 A1 | 6/2016 | Jung et al. |
| 2016/0170553 A1 | 6/2016 | Hatanaka et al. |
| 2016/0154956 A1 | 11/2016 | Fadell |
| 2017/0053152 A1 | 2/2017 | Medina |
| 2017/0169204 A1 | 6/2017 | Fadell |
| 2017/0199997 A1 | 7/2017 | Fadell et al. |

(56) References Cited

U.S. PATENT DOCUMENTS

| | | | |
|---|---|---|---|
| 2018/0121960 A1 | 5/2018 | Jung et al. | |
| 2018/0218404 A1 | 8/2018 | Jung et al. | |
| 2020/0098006 A1 | 3/2020 | Jung et al. | |

FOREIGN PATENT DOCUMENTS

| | | | |
|---|---|---|---|
| CN | 1242850 A | 1/2000 | |
| CN | 1054450 C | 7/2000 | |
| CN | 1267990 A | 9/2000 | |
| CN | 1348129 A | 5/2002 | |
| CN | 1357808 A | 7/2002 | |
| CN | 1097768 C | 1/2003 | |
| CN | 1122936 C | 10/2003 | |
| CN | 1129290 C | 11/2003 | |
| CN | 1605185 A | 4/2005 | |
| CN | 1661662 A | 8/2005 | |
| CN | 1664767 A | 9/2005 | |
| CN | 1688958 A | 10/2005 | |
| CN | 1694552 A | 11/2005 | |
| CN | 2758855 Y | 2/2006 | |
| CN | 1758237 A | 4/2006 | |
| CN | 1763701 A | 4/2006 | |
| CN | 1763714 A | 4/2006 | |
| CN | 1779622 A | 5/2006 | |
| CN | 101461219 | 6/2006 | |
| CN | 1860052 A | 11/2006 | |
| CN | 1862707 A | 11/2006 | |
| CN | 1866981 A | 11/2006 | |
| CN | 1869907 A | 11/2006 | |
| CN | 1881153 A | 12/2006 | |
| CN | 1892947 A | 1/2007 | |
| CN | 1920751 A | 2/2007 | |
| CN | 1932736 A | 3/2007 | |
| CN | 1967614 A | 5/2007 | |
| CN | 1326021 C | 7/2007 | |
| CN | 1994686 A | 7/2007 | |
| CN | 200950262 Y | 9/2007 | |
| CN | 101052179 A | 10/2007 | |
| CN | 100353322 C | 12/2007 | |
| CN | 101089799 A | 12/2007 | |
| CN | 100368972 C | 2/2008 | |
| CN | 101206068 A | 6/2008 | |
| CN | 101222577 A | 7/2008 | |
| CN | 101242602 A | 8/2008 | |
| CN | 101287036 A | 10/2008 | |
| CN | 101308402 A | 11/2008 | |
| CN | 201171004 Y | 12/2008 | |
| CN | 100462905 C | 2/2009 | |
| CN | 201214236 Y | 4/2009 | |
| CN | 201226308 Y | 4/2009 | |
| CN | 100486841 C | 5/2009 | |
| CN | 101426104 A | 5/2009 | |
| CN | 100501647 C | 6/2009 | |
| CN | 101452365 A | 6/2009 | |
| CN | 101461219 A | 6/2009 | |
| CN | 101470578 A | 7/2009 | |
| CN | 101470579 A | 7/2009 | |
| CN | 101499796 A | 8/2009 | |
| CN | 101524269 A | 9/2009 | |
| CN | 100559415 C | 11/2009 | |
| CN | 101598960 A | 12/2009 | |
| CN | 101615102 A | 12/2009 | |
| CN | 100583010 C | 1/2010 | |
| CN | 101655765 A | 2/2010 | |
| CN | 201395986 Y | 2/2010 | |
| CN | 101686815 A | 3/2010 | |
| CN | 201467294 U | 5/2010 | |
| CN | 101825986 A | 9/2010 | |
| CN | 101853096 A | 10/2010 | |
| CN | 101853125 | 10/2010 | |
| CN | 101853379 A | 10/2010 | |
| CN | 101866200 A | 10/2010 | |
| CN | 101650615 B | 1/2011 | |
| CN | 101980329 A | 2/2011 | |
| CN | 1885928 B | 4/2011 | |
| CN | 102012735 A | 4/2011 | |
| CN | 1801708 B | 5/2011 | |
| CN | 102043434 A | 5/2011 | |
| CN | 102063215 A | 5/2011 | |
| CN | 102073442 A | 5/2011 | |
| CN | 101750850 B | 6/2011 | |
| CN | 102098620 A | 6/2011 | |
| CN | 102103461 A | 6/2011 | |
| CN | 102160368 A | 8/2011 | |
| CN | 102164221 A | 8/2011 | |
| CN | 102215290 A | 10/2011 | |
| CN | 102216889 A | 10/2011 | |
| CN | 201655570 U | 11/2011 | |
| CN | 102314755 A | 1/2012 | |
| CN | 102375552 A | 3/2012 | |
| CN | 202189345 U | 4/2012 | |
| CN | 101916501 B | 5/2012 | |
| CN | 102447852 A | 5/2012 | |
| CN | 102459861 A | 5/2012 | |
| CN | 101124810 B | 6/2012 | |
| CN | 102508591 A | 6/2012 | |
| CN | 101752734 B | 9/2012 | |
| CN | 102736734 A | 10/2012 | |
| CN | 102741795 A | 10/2012 | |
| CN | 101976168 B | 1/2013 | |
| CN | 102880332 A | 1/2013 | |
| CN | 102109963 B | 3/2013 | |
| CN | 102013707 B | 7/2013 | |
| CN | 101542921 B | 8/2013 | |
| CN | 101853379 B | 5/2014 | |
| CN | 101828162 | 7/2014 | |
| CN | 102216897 B | 7/2014 | |
| CN | 102109920 B | 8/2014 | |
| CN | 102546924 B | 10/2014 | |
| CN | 102326408 B | 12/2014 | |
| CN | 102272875 B | 3/2015 | |
| CN | 102369725 B | 4/2015 | |
| CN | 102760026 B | 9/2015 | |
| CN | 102906675 B | 9/2015 | |
| CN | 102438092 B | 3/2016 | |
| CN | 102566859 B | 6/2016 | |
| CN | 107071203 A | 8/2017 | |
| CN | 107105114 A | 8/2017 | |
| DE | 197 10 546 | 9/1998 | |
| DE | 198 37 642 | 11/1999 | |
| DE | 101 20 067 | 6/2002 | |
| EP | 0 635 947 A2 | 1/1999 | |
| EP | 0 927 925 A2 | 7/1999 | |
| EP | 0 949 578 | 10/1999 | |
| EP | 0 969 644 | 1/2000 | |
| EP | 1 384 689 A1 | 1/2004 | |
| EP | 1 460 523 A2 | 9/2004 | |
| EP | 1 486 998 A1 | 12/2004 | |
| EP | 1 548 548 A2 | 6/2005 | |
| EP | 1 548 549 A2 | 6/2005 | |
| EP | 1 595 777 A2 | 11/2005 | |
| EP | 1 607 844 A2 | 12/2005 | |
| EP | 1 390 928 A1 | 4/2006 | |
| EP | 1 647 941 A1 | 4/2006 | |
| EP | 1 669 264 A1 | 6/2006 | |
| EP | 1 677 261 A2 | 7/2006 | |
| EP | 1 178 507 B1 | 11/2006 | |
| EP | 1 721 327 A1 | 11/2006 | |
| EP | 1 724 668 A2 | 11/2006 | |
| EP | 1 764 986 A1 | 3/2007 | |
| EP | 1 821 177 A1 | 8/2007 | |
| EP | 1 847 117 A1 | 10/2007 | |
| EP | 1 884 869 A2 | 2/2008 | |
| EP | 1 263 199 B1 | 7/2008 | |
| EP | 1 990 734 A1 | 11/2008 | |
| EP | 2 003 538 A1 | 12/2008 | |
| EP | 2 076 000 A2 | 7/2009 | |
| EP | 2 146 493 A2 | 1/2010 | |
| EP | 2 148 497 A1 | 1/2010 | |
| EP | 2 192 519 A1 | 6/2010 | |
| EP | 2 192 528 A1 | 6/2010 | |
| EP | 2 223 531 A1 | 9/2010 | |
| EP | 2 230 623 A1 | 9/2010 | |
| EP | 2 288 126 A1 | 2/2011 | |

(56) References Cited

FOREIGN PATENT DOCUMENTS

| | | |
|---|---|---|
| EP | 2 332 768 A1 | 6/2011 |
| EP | 2 356 665 A1 | 8/2011 |
| EP | 2 368 165 A1 | 9/2011 |
| EP | 2 386 976 A1 | 11/2011 |
| EP | 2 409 488 A1 | 1/2012 |
| EP | 2 413 216 A1 | 2/2012 |
| EP | 2 469 443 A1 | 6/2012 |
| EP | 2 382 528 A1 | 7/2012 |
| EP | 2 507 695 A1 | 10/2012 |
| EP | 2 521 965 A1 | 11/2012 |
| EP | 2 770 643 A2 | 8/2014 |
| EP | 2 057 750 B1 | 3/2015 |
| EP | 2 226 741 A1 | 4/2016 |
| JP | H05 1993-91387 A | 4/1993 |
| JP | H05 1993-324183 A | 12/1993 |
| JP | H06 1994-20570 A | 1/1994 |
| JP | H06 1994-119112 A | 4/1994 |
| JP | H07 1995-112452 A | 5/1995 |
| JP | H07 1995-271562 A | 10/1995 |
| JP | H08 1996-006720 A | 1/1996 |
| JP | 2535697 B2 | 9/1996 |
| JP | H09 1997-330140 A | 12/1997 |
| JP | H10 1998-11217 A | 1/1998 |
| JP | H10 1998-97234 | 4/1998 |
| JP | H10 1998-177411 A | 6/1998 |
| JP | H10 1998-224289 A | 8/1998 |
| JP | 2814299 B2 | 10/1998 |
| JP | H11 1999-203044 A | 7/1999 |
| JP | H11 1999-265260 A | 9/1999 |
| JP | H11-328362 A | 11/1999 |
| JP | 2000-013478 A | 1/2000 |
| JP | 2000-184050 A | 6/2000 |
| JP | 2000-217014 A | 8/2000 |
| JP | 2000-270072 A | 9/2000 |
| JP | 2000-305699 A | 11/2000 |
| JP | 2000-341570 | 12/2000 |
| JP | 2001-147797 A | 5/2001 |
| JP | 3190662 B2 | 7/2001 |
| JP | 3218643 B2 | 10/2001 |
| JP | 2002-24712 A | 1/2002 |
| JP | 2002-094658 A | 3/2002 |
| JP | 2002-132447 A | 5/2002 |
| JP | 2002-207525 A | 7/2002 |
| JP | 2002-222022 A | 8/2002 |
| JP | 2002-291051 A | 10/2002 |
| JP | 2002-333661 A | 11/2002 |
| JP | 2003-013646 A | 1/2003 |
| JP | 2003-143290 A | 5/2003 |
| JP | 2004-023651 A | 1/2004 |
| JP | 2004-077990 | 3/2004 |
| JP | 2004-080080 A | 3/2004 |
| JP | 3535844 B2 | 6/2004 |
| JP | 3544806 B2 | 7/2004 |
| JP | 2005-524164 A | 8/2005 |
| JP | 3684183 B2 | 8/2005 |
| JP | 2007-086977 | 9/2005 |
| JP | 2006-086977 | 3/2006 |
| JP | 2006-86998 | 3/2006 |
| JP | 2006-155455 | 6/2006 |
| JP | 2002-207525 | 7/2006 |
| JP | 2006-309752 A | 11/2006 |
| JP | 3861040 B2 | 12/2006 |
| JP | 2007-047931 A | 2/2007 |
| JP | 2007-164372 | 6/2007 |
| JP | 2007-179343 A | 7/2007 |
| JP | 2007-0520046 A | 7/2007 |
| JP | 2007-233505 A | 9/2007 |
| JP | WO 2007/119818 | 10/2007 |
| JP | 4007734 B2 | 11/2007 |
| JP | 4100568 B2 | 6/2008 |
| JP | 2008-172504 | 7/2008 |
| JP | 4134620 B2 | 8/2008 |
| JP | 4141389 B2 | 8/2008 |
| JP | 4167099 B2 | 10/2008 |
| JP | 4179269 B2 | 11/2008 |
| JP | 2008-306560 | 12/2008 |
| JP | 4192320 B2 | 12/2008 |
| JP | 4225418 B2 | 2/2009 |
| JP | 4240249 B2 | 3/2009 |
| JP | 2009-212558 A | 9/2009 |
| JP | 2009-239477 A | 10/2009 |
| JP | 4338513 B2 | 10/2009 |
| JP | 4358262 B2 | 11/2009 |
| JP | 4424814 B2 | 3/2010 |
| JP | 4427485 B2 | 3/2010 |
| JP | 4611000 B2 | 1/2011 |
| JP | 4626453 B2 | 2/2011 |
| JP | 4630644 B2 | 2/2011 |
| JP | 2011-118061 A | 6/2011 |
| JP | 2011-118769 A | 6/2011 |
| JP | 4764274 B2 | 8/2011 |
| JP | 2011-233142 A | 11/2011 |
| JP | 4819465 B2 | 11/2011 |
| JP | 2011-248868 A | 12/2011 |
| JP | 2012-003404 A | 1/2012 |
| JP | 2012-014340 A | 1/2012 |
| JP | 4858537 B2 | 1/2012 |
| JP | 2012-029231 A | 2/2012 |
| JP | 4884867 B2 | 2/2012 |
| JP | 2012-074912 A | 4/2012 |
| JP | 4949686 B2 | 6/2012 |
| JP | 4969472 B2 | 7/2012 |
| JP | 2012-155434 A | 8/2012 |
| JP | 2012-191445 A | 10/2012 |
| JP | 5106647 B2 | 12/2012 |
| JP | 2013-037628 A | 2/2013 |
| JP | 2013-058082 A | 3/2013 |
| JP | 5163453 B2 | 3/2013 |
| JP | 2013-071593 A | 4/2013 |
| JP | 5199295 B2 | 5/2013 |
| JP | 2013-0522752 A | 6/2013 |
| JP | 5316387 B2 | 10/2013 |
| JP | 5353580 B2 | 11/2013 |
| JP | 5370374 B2 | 12/2013 |
| JP | 5595939 B2 | 9/2014 |
| JP | 5625612 B2 | 11/2014 |
| JP | 5730866 B2 | 6/2015 |
| KR | 10 1997 0009545 A | 3/1997 |
| KR | 20 1998 0014122 | 6/1998 |
| KR | 10-1998-085647 | 12/1998 |
| KR | 10 2001 0009136 A | 2/2001 |
| KR | 10-2001-0026243 A | 4/2001 |
| KR | 10-0311031 B1 | 11/2001 |
| KR | 2002-0061054 | 7/2002 |
| KR | 10 2002 0090061 A | 11/2002 |
| KR | 10-2003-0023199 A | 3/2003 |
| KR | 10 2003 0060338 A | 7/2003 |
| KR | 10-2003-0079543 | 10/2003 |
| KR | 10-0421369 B1 | 3/2004 |
| KR | 10 2004 0085628 A | 10/2004 |
| KR | 10 2004 0098336 A | 11/2004 |
| KR | 10-0455145 B1 | 11/2004 |
| KR | 10 2004 0111101 A | 12/2004 |
| KR | 10 2005 0009024 A | 1/2005 |
| KR | 10 2005 0012617 A | 2/2005 |
| KR | 10 2005 0063779 A | 6/2005 |
| KR | 10-2005-0079475 A | 8/2005 |
| KR | 10 2006 0008735 A | 1/2006 |
| KR | 10 2006 0008788 A | 1/2006 |
| KR | 10 0545291 B1 | 1/2006 |
| KR | 10 2006 0014883 A | 2/2006 |
| KR | 10 0555697 B1 | 3/2006 |
| KR | 10 2006 0031926 A | 4/2006 |
| KR | 10-2006-0033664 A | 4/2006 |
| KR | 10-2006-0041634 A | 5/2006 |
| KR | 10 2006 0054720 A | 5/2006 |
| KR | 10 2006 0072903 A | 6/2006 |
| KR | 10 2006 0073293 A | 6/2006 |
| KR | 10 2006 0078019 | 7/2006 |
| KR | 10 2006 0080109 | 7/2006 |
| KR | 10 2006 0083792 | 7/2006 |
| KR | 10 0597008 B1 | 7/2006 |
| KR | 10 0609214 | 8/2006 |
| KR | 10 0617152 B1 | 8/2006 |

(56) References Cited

FOREIGN PATENT DOCUMENTS

| | | |
|---|---|---|
| KR | 2004 25107 Y1 | 8/2006 |
| KR | 10 2006 0095990 A | 9/2006 |
| KR | 10 0635556 B1 | 10/2006 |
| KR | 10 2006 0133890 A | 12/2006 |
| KR | 10 0655963 B1 | 12/2006 |
| KR | 10 0675151 B1 | 1/2007 |
| KR | 10-0697145 B1 | 3/2007 |
| KR | 10 2007 0047064 A | 5/2007 |
| KR | 10 2007 0054276 A | 5/2007 |
| KR | 10 0718138 B1 | 5/2007 |
| KR | 10 2007 0062249 A | 6/2007 |
| KR | 10 0732044 B1 | 6/2007 |
| KR | 10-2007-0076317 A | 7/2007 |
| KR | 1 00752141 B1 | 8/2007 |
| KR | 10 2007 0079519 A | 8/2007 |
| KR | 10 2007 0087444 A | 8/2007 |
| KR | 10 2007 0091250 A | 9/2007 |
| KR | 10 0754674 B1 | 9/2007 |
| KR | 10 2007 0096367 A | 10/2007 |
| KR | 10 2007 0111770 A | 11/2007 |
| KR | 10 2007 0113540 A | 11/2007 |
| KR | 10 2007 0114258 A | 11/2007 |
| KR | 10 0776992 B1 | 11/2007 |
| KR | 10-0780020 B1 | 11/2007 |
| KR | 10 0795189 B1 | 1/2008 |
| KR | 10 2008 0025951 A | 3/2008 |
| KR | 10 0835593 B1 | 6/2008 |
| KR | 10 2008 0062208 A | 7/2008 |
| KR | 10-2008-0086757 A | 9/2008 |
| KR | 10 0860685 B1 | 9/2008 |
| KR | 10 2008 0089544 A | 10/2008 |
| KR | 10 2009 0011113 A | 2/2009 |
| KR | 10 2009 0012878 A | 2/2009 |
| KR | 10 2009 0024457 A | 3/2009 |
| KR | 10 2009 0027088 A | 3/2009 |
| KR | 10 2009 0027232 A | 3/2009 |
| KR | 10 2009 0037246 A | 4/2009 |
| KR | 10 2009 0049863 A | 5/2009 |
| KR | 10 2009 0058041 A | 6/2009 |
| KR | 10 2009 0065766 A | 6/2009 |
| KR | 10 2009 0075170 A | 7/2009 |
| KR | 10 2010 0011742 A | 2/2010 |
| KR | 10-2010-0027855 A | 3/2010 |
| KR | 10 0944862 B1 | 3/2010 |
| KR | 10 2010 0038017 A | 4/2010 |
| KR | 10-2010-0049986 A | 5/2010 |
| KR | 10-2010-0057461 A | 5/2010 |
| KR | 10 2010 0058787 A | 6/2010 |
| KR | 10 2011 0013296 A | 2/2011 |
| KR | 10 2011 0013997 A | 2/2011 |
| KR | 10 2011 0025249 A | 3/2011 |
| KR | 10 1018459 B1 | 3/2011 |
| KR | 10 2011 0047738 A | 5/2011 |
| KR | 10 2011 0069476 A | 6/2011 |
| KR | 10 2011 0084580 A | 7/2011 |
| KR | 10-2011-0098723 A | 9/2011 |
| KR | 10 2011 0103598 A | 9/2011 |
| KR | 10 2011 0111000 A | 10/2011 |
| KR | 10 2011 0115347 A | 10/2011 |
| KR | 10 1074605 B1 | 10/2011 |
| KR | 10-1081432 B1 | 11/2011 |
| KR | 10-1083161 B1 | 11/2011 |
| KR | 10 1097020 B1 | 12/2011 |
| KR | 10 2012 0006422 A | 1/2012 |
| KR | 10-1104122 B1 | 1/2012 |
| KR | 10 1106278 B1 | 1/2012 |
| KR | 10-1122476 B1 | 3/2012 |
| KR | 10 2012 0043476 A | 5/2012 |
| KR | 10 2012 0065693 A | 6/2012 |
| KR | 10-1160681 B1 | 6/2012 |
| KR | 10 1167752 B1 | 7/2012 |
| KR | 10-2012-0113714 | 10/2012 |
| KR | 10 2012 0113770 A | 10/2012 |
| KR | 10-1202854 B1 | 11/2012 |
| KR | 10 2013 0005278 A | 1/2013 |
| KR | 10-2013-0104682 A | 9/2013 |
| KR | 10 1403300 B1 | 6/2014 |
| KR | 10-1441217 B1 | 9/2014 |
| KR | 10 1445070 B1 | 10/2014 |
| KR | 10 1549558 B1 | 9/2015 |
| KR | 101549556 B1 | 9/2015 |
| KR | 10-1572071 B1 | 11/2015 |
| KR | 10 1743505 B1 | 6/2017 |
| KR | 10 1780499 B1 | 9/2017 |
| WO | WO 2001/59558 | 8/2001 |
| WO | WO 2001/075580 | 10/2001 |
| WO | WO 2002/28067 | 4/2002 |
| WO | WO 2002/046902 | 6/2002 |
| WO | WO 2002/069298 | 9/2002 |
| WO | WO 2003/079291 | 9/2003 |
| WO | WO 2004/034730 | 4/2004 |
| WO | WO 2005/030541 | 4/2005 |
| WO | WO 2005/073993 | 8/2005 |
| WO | WO 2007/140806 | 6/2006 |
| WO | WO 2006/085850 | 8/2006 |
| WO | WO 2007/033358 | 3/2007 |
| WO | WO 2007/050819 | 5/2007 |
| WO | WO 2007/055907 | 5/2007 |
| WO | WO 2007/086571 | 8/2007 |
| WO | WO 2007/140806 | 12/2007 |
| WO | WO 2008/018677 | 2/2008 |
| WO | WO 2008/081420 | 7/2008 |
| WO | WO 2008/131249 | 10/2008 |
| WO | WO2009/055741 | 4/2009 |
| WO | WO 2010/043277 | 4/2010 |
| WO | WO 2010/052280 | 5/2010 |
| WO | WO2010/076373 | 7/2010 |
| WO | WO 2010/092993 | 8/2010 |
| WO | WO 2010/107620 | 9/2010 |
| WO | WO 2010/126504 | 11/2010 |
| WO | WO 2010/140851 | 12/2010 |
| WO | WO 2011/034831 | 3/2011 |
| WO | WO 2011/038626 | 4/2011 |
| WO | WO 2011/067890 | 6/2011 |
| WO | WO 2011/081371 | 7/2011 |
| WO | WO 2011/084157 | 7/2011 |
| WO | WO 2011/111504 | 9/2011 |
| WO | WO 2011/150878 | 12/2011 |
| WO | WO 2011/151988 | 12/2011 |
| WO | WO 2013/014709 | 1/2013 |
| WO | WO 2013/060940 | 5/2013 |
| WO | WO 2013/177173 | 11/2013 |
| WO | WO 2014/022347 | 2/2014 |
| WO | WO2004/079556 | 9/2016 |

OTHER PUBLICATIONS

Office Action dated Feb. 24, 2018 in corresponding Chinese Patent Application No. 201510615720.3 and its English translation—10 pages.

Office Action dated Jul. 12, 2019 in corresponding Chinese Patent Application No. 201610520221.0.

Invalidation Request dated Mar. 26, 2019 in corresponding Chinese Patent Application No. 201280061355.0.

Office Action dated Apr. 2, 2019 in corresponding Chinese Patent Application No. 201610517674.8.

Invalidation Request dated Jun. 11, 2019 in corresponding Chinese Patent Application No. 201510615720.3.

EP Search Report of corresponding European Patent Application No. 20120842666.

European Search Report dated Mar. 10, 2016 of corresponding European Patent Application No. 15195436.9 in 11 pages.

Office Action dated Sep. 26, 2016 of corresponding Japanese Patent Application No. 2014-147884 and its English translation—? pages.

Office Action dated Oct. 20, 2016 of corresponding Japanese Patent Application No. 2014-536982 and its English translation—8 pages.

Office Action dated Dec. 5, 2017 in corresponding Japanese Patent Application No. 2014-536982—9 pages.

International Search Report dated Mar. 20, 2013 of corresponding PCT Application PCT/KR2012/008470 (W0/2013/058533).

Acer Tempo M900 "http://www.theregister.co.uk/2009/07/15review_phone_acer_tempo_m900/".

(56) References Cited

OTHER PUBLICATIONS

Angulo et al., "Exploring Touch-Screen Biometrics for User Identification on Smart Phones" 14 pages, (Jan. 2012).
Concept iPhone 5 with Fingerprint Scanner "http:gadgetsin.com/concept -i phone-5-with-fingerprint -scanner.htm". (Aug. 24, 2011).
Dietz, "AuthenTec Unveils the World's Smallest Navigation and Fingerprint Matching Device for Mobile Phones", Business Wire, 2010—2 pages.
[English Translation of Previously Submitted Reference Filed Nov. 5, 2018]] User's manual, NTT docomo, Jul. 2011, first edition, p. 21-23, in 9 pages (online) (Downloaded on Jul. 31, 2018 by Japanese Patent Office) https://www.nttdocomo.co.jp/binary/pdf/support/trouble/manual/download/F-12C_J_OP_All.pdf.
Grobart, "16 Tips to Take Your iPhone to the Next Level", The New York Times, Apr. 27, 2011 in 4 pages.
IPhone 4 Perfect Guide mini, Ascii Mediaworks K.K., Aug. 29, 2010, pp. 6-10, 12, 21, 23, 36, 44, 45, 55, 107, 110.
IPhone User Guide (For iOS 4.2 and4.3 Software) (Apple Inc.) Mar. 9, 2011 Chapter 1.
LG Unveils Impressive Line of Smart, Feature-Rich Products at International CES 201 O, PR Newswire, retrieved from http://www.prnewswire.corn/news-releases/lg-unveils-impressive-line-of-smart-feature-rich-products-at-international-ces-2010-80803492. html on Oct. 12, 2016.
Malykhina, "Fujitsu Adds Mobile Phone With Fingerprint Sensor", Information Week, retrieved from http://www.informationweek. corn/fujitsu-adds-mobile-phone-with-fingerprint-sensor/d/d-id/1064540?—5 pages, (Feb. 12, 2008).
Manual for FOMA D703i, NTT Do Co Mo, Jan. 2007 and its English translation—44 pages.
Motorola Atrix 4G review, engadget, retrieved from https://www.engadget.corn/motorola/atrix-4g-review/on Nov. 1, 2016.
Pocovnicu, "Biometric Security for Cell Phones", Informatica Economicii, 2009, vol. 13, No. 1, pp. 57-63.
Think Vantage Fingerprint Software, International Business Machines Corporation, First Edition, Nov. 2005 "http: download. lenovo .corn/ibmdl/pub/pc/pccbbs/thinkvantage en/tfs56ug_en.pdf."
WidgetLocker adds any widget to Android lock screen, Uploaded to YouTube on Jul. 15, 2010, https://www.youtube.com/watch7v~cVXflr6xd4E.
WidgetLocker Lockscreen Android App Review, Hemorrdroidsnet, Uploaded to YouTube on Jul. 26, 2010, https://www.youtube.com/watch7v~9InD 1 QTy5IY.
Wroblewski, "Apple's Overloaded iPhone Button", Aug. 17, 2011, downloaded from https://www.lukew.com/ff/entry.asp? 1382.
Yuan et al., "User Authentication on Mobile Devices with Dynamical Selection of Biometric Techniques for Optimal Performance", Presentation Material of International Conference on Robotics and Biomimetics, 2010, pp. 333-338.
First Action Interview Pilot Program Pre-Interview Communication dated Nov. 5, 2015 of U.S. Appl. No. 14/848,156 which is the parent application—11 pages.
Office Action dated Jun. 2, 2017 of related U.S. Appl. No. 15/013,951—16 pages.
Bonnie Cha, "AT&T reveals pricing, release date for Motorola Atrix 4G," <https://www.cnet.com/news/at-t-reveals-pricing-relase-date-for-motorola-atrix-4g/> (Feb. 3, 2011).
Mil'shtein, Mobile Fingerprint Capture (Dec. 31, 2012).
Pocovnicu, Biometric Security for Cell Phones, Informatica Economica, vol. 13, No. 1 (Jan. 2009).
Ricci et al., SecurePhone: A Mobile Phone with Biometric Authentication and E-Signature Support for Dealing Secure Transactions on the Fly (2006).
Solid-State Fingerprint Detection, An AuthenTec White Paper (2000).
Acer Announces Tempo Line of Smartphones: X960, F900, M900 and DX900, <http://bgr.com/2009/02/16/acer-announces-tempo-line-of-smartphones-x960-f900-m900-and-dx900/> (Feb. 16, 2009).
Acer Smartphone Launching Feb. 16, <https://www.cnet.com/news/acer-smartphone-launching-feb-16/>, (Jan. 28, 2009).
Acer M900 User Guide (Mar. 2009).
Apple iPhone iOS 3.1 User Guide (2009).
Apple iPhone 3G Finger Tips Guide (2009).
Apple iPhone 3G Important Product Information Guide (Sep. 3, 2009).
Apple Introduces the New iPhone 3G, <hhttps://www.apple.com/newsroom/2008/06/09Apple-Introduces-the-New-iPhone-3G/> (Jun. 9, 2008).
Apple Support Manuals (downloaded from https://support.apple.com/en_US/manuals/iphone on Nov. 2, 2018).
Biometrics: Fingerprint Sensor Products (downloaded on Oct. 15, 2018 from http://biometrics.mainguet.org/types/fingerprint/fingerprint_sensors_productsi.htm).
Fingerprint Sensing Techniques (downloaded on Oct. 15, 2018 from http://biometrics.mainguet.org/types/fingerprint/fingerprint_sensors_physics.htm#RF).
Apple Acquires AuthenTec for $356 Million (downloaded on Oct. 15, 2018 from http://biometrics.mainguet.org/types/fingerprint/fingerprint_apple.htm).
AuthenTec AF-S2 FingerLoc Fingerprint Sensor flyer (May 2000).
AuthenTec Product Specification for the AF-S2 Fingerprint Sensor (Dec. 5, 2000).
AuthenTec AES4000 EntrePad Fingerprint Sensor flyer (Sep. 2000).
AutheTec Product Specification for the AES4000 Fingerprint Sensor (Dec. 5, 2000).
AuthenTec AFS8500 FingerLoc Fingerprint Sensor flyer (May 2002).
AuthenTec Product Specification for the AFS8500 Fingerprint Sensor (May 30, 2002).
AuthenTec FingerLoc 8600 flyer (Jan. 2004).
AuthenTec AES3500 EntrePad Fingerprint Sensor (Sep. 2000).
AuthenTec EntrePad AES3500 flyer (Sep. 2000).
AuthenTec EntrePad AES3400 Fingerprint Sensor flyer (Sep. 2002).
AuthenTec EntrePad AES3400 Fingerprint Sensor Product Family Specification (Oct. 13, 2003).
AuthenTec AES2500 EntrePad Fingerprint Sensor flyer (Oct. 2002).
AuthenTec EntrePad AES2502 Fingerprint Sensor for Serial Interface Applications flyer (Dec. 2003).
AuthenTec EntrePad AES2510 Fingerprint Sensor flyer (Dec. 2003).
AuthenTec EntrePad AES2501 Fingerprint Sensor for USB Applications flyer (2004).
AuthenTec EntrePad AES2501A Fingerprint Sensor Product Specification (Nov. 17, 2004).
AuthenTec EntrePad AES2501B Fingerprint Sensor Hardware Specification (Jul. 12, 2006).
AuthenTec AES2810 flyer (Feb. 2008).
AuthenTec AES2550 flyer (Jun. 2008).
AuthenTec AES2660 flyer (Feb. 2010).
AuthenTec AES2750 Smart Sensor flyer (May 2012).
AuthenTec EntrePad AES1610 Slide Sensor Data Sheet (Feb. 2007).
AuthenTec AES1710 flyer (Mar. 2007).
AuthenTec AES1711 flyer (Feb. 2008).
AuthenTec AES1660 flyer (Aug. 2009).
Announced: HTC Announces the HTC P6500 Vertical Market Windows Mobile Smartphone, <http://www.theunwired.net/index.php?item=announced-htc-announces-the-htc-p6500-vertical-market-windows-mobile-smartphone (Oct. 1, 2007).
HTC PDA Phone User Manual (2007).
HTC PDA Phone User Manual (2008).
Hitachi's W51H Comes with AuthenTec Fingerprint Sensor (downloaded Oct. 25, 2018 from https://cellphonebeat.com/hitachis-w51h-comes-with-authentec-fingerprint-sensor.html).
New Hitachi Mobile Phone Uses AuthenTec Fingerprint Sensor for Security and Handset Navigation, <https://www.businesswire.com/news/home/20070425005781/en/New-Hitachi-Mobile-Ph . . . > (Apr. 25, 2007).
Hitachi W51H Basic Manual (Jan. 2007).
Unveiled: AT&T and LG Announces the LG eXpo GW820 Windows Mobile Smartphone, <http://www.theunwired.net/?item=unveiled-att-and-lg-announces-the-lg-expo-gw820-windows-mobile-smartphone&5219 (Nov. 30, 2009).
LG eXpo Datasheet (Nov. 11, 2009).
LG eXpo User Guide (2009).

(56) References Cited

OTHER PUBLICATIONS

LG eXpo Quickstart Guide (Nov. 11, 2009).
Atrix 4G QuickStart (2011).
Atrix US-EN UG 68014798001B (2011).
Motorola Mobility and AT&T Announce ATRIXTM 4G, the Future of Mobile Computing, <https://web.archive.org/web/20110111164756/http://www.fiercemobilecontent.com/press-releases/Motorola-mobility-and-att-announce-atrixtm-4g-future-mobile-computing/> (Jan. 5, 2011).
Motorola ATRIX 4G User's Guide (2011).
Motorola ATRIX OS23 User's Guide (2011).
"ATRIX—Fingerprint Smart Sensor," Motorola.com ("Motorola Fingerprint Sensor Guide") (downloaded on Nov. 5, 2018 from https://support.motorola.com/in/en/solution/MS63688).
"The World's Most Significant Smartphone," Ken Werner, <https://web.archive.org/web/20110123061805/http://displaydaily.com/2011/01/13/the-worlds-most-significant-new-smart-phone>, Jan. 13, 2011 ("Significant Smartphone Article").
"Motorola Atrix 4G Review", Joshua Topolsky, <https://www.engadget.com/Motorola/atrix-4g-review/>, Feb. 14, 2011 ("Engadget Review").
Cnet CES 2011 Video Review, Jan. 14, 2011 (https://www.youtube.com/watch?v=GkJp_sLYbeM).
"AT&T gets official with Motorola Atrix 4G pricing, release date," Rachel King, <https://www.zdnet.com/article/at-t-gets-official-with-motorola-atrix-4g-pricing-release-date/>, Feb. 3, 2011.
"It's official: Motorola pushes up Atrix 4G launch to Feb. 22," Joseph Flatley,<https://www.engadget.com/2011/02/17/its-official-motorola-pushes-up-atrix-4g-lauch-to- . . . >, Feb. 17, 2011.
"Motorola Atrix 4G (AT&T)," Sascha Segan and Jamie Lendino, <https://www.pcmag.com/article2/0,2817,2379916,00.asp>, Aug. 8, 2011.
"Motorola Atrix 4G Smartphone Review", Shelly Palmer, <https://www.shellypalmer.com/2011/03/Motorola-atrix-smartphone-review/>, Dec. 1, 2012.
Motorola Solutions Introduces ES400 Enterprise Digital Assistant for Task Completion Anywhere, Anytime (Dec. 1, 2010).
Motorola ES400 User Guide (Sep. 2010).
Motorola ES400 Full Phone Specifications (downloaded on Jul. 2, 2018 from https://www.gsmarena.com/motorola_es400-3409.php).
Pantech to Unveil the World's First Fingerprint Recognition Mobile Phone w/ Mega Pixel Camera, <http://www.pantech.co.kr/en/promotion/overageView.do> (Mar. 2, 2006).
Pantech Launches Fingerprint-Recognition Mobile Phones (Dec. 1, 2004).
Pantech Launches Korea's First Smartphone with Introduction of PH-S8000T, in Partnership with Microsoft and Intel, <http://www.pantech.co.kr/en/promotion/coverageView.do> (Mar. 3, 2006).
Pantech Mobile Phone Russian Wing Wings (downloaded on Jun. 14, 2018 from http://www.pantech.co.kr/promotion/coverageView.do).
Pantech Launches World's First Fingerprint Recognition Mobile Phone with 1.3 Mega Pixels Camera (Dec. 1, 2004).
Pantech Launches Fingerprint-Recognition Handset (Aug. 3, 2004).
Chinese Telecom Fair Opens Tuesday (Oct. 26, 2004).
Pantech Began Exporting World's First Fingerprint Recognition Megapixel Camera Phone GI100 (downloaded on Jun. 14, 2018 from http://www.pantech.co.kr/promotion/coverageView.do).
Pantech GI100 User Manual (received from Apple in relation to Invalidity Contentions dated Nov. 6, 2018 in a lawsuit before U.S. District Court, Northern District of California, Case No. 3:18-cv-02245-JD).
Vendors Unveil Latest Handsets (Feb. 19, 2007).
Toshiba Offers Enterprise Handset (Feb. 13, 2007).
Atrua Fingerprint Touch Controls Enable Data Protection and Usability Enhancements in Toshiba 3G Phones; First Fingerprint Phones for Europe Include Innovative Touch Scrolling Feature (Feb. 12, 2007).
Toshiba G500 User Guide (Mar. 6, 2007).
Toshiba G900 User Guide (Apr. 11, 2007).
Biometric Fingerprint Sensors (downloaded on Oct. 15, 2018 from http://biometrics.mainguet.org/types/fingerprint/fingerprint_sensors_productsi.htm).
Single Fingerprint Readers; Optical & Silicon Readers (downloaded on Oct. 15, 2018 from https://www.crossmatch.com/biometric-identity-soluctions/products/hardware/single-finger-readers/).
UPEK Embedded Fingerprint Sensor Solutions (2009).
The UniBO Fingerprint Capacitive Sensor (downloaded on Oct. 15, 2018 from http://www.micro.deis.unibo.it/~tartagni/Finger/FingerSensor.html).
Fingerprint Sensing Techniques (downloaded on Oct. 15, 2018 from http://biometrics.mainguet.org/types/fingerprint/fingerprint_sensors_physics.htm#silicon_capacitance).
STMicroelectronics TCS1AD TouchChip Fingerprint Sensor flyer (2001).
CrossMatch TouchChip TCS1 flyer (Oct. 10, 2014).
STMicroelectronics TCS2AF Silicon Fingerprint Sensor flyer (2001).
CrossMatch TouchChip TCS2 Sensor flyer (Sep. 26, 2014).
STMicroelectronics TCS3B-TCD41B TouchStrip Chipset flyer (Oct. 2003).
CrossMatch TouchChip TCS4K Sensor flyer (Sep. 17, 2014).
CrossMatch TouchCHip TCS4H Sensor flyer (Sep. 30, 2014).
U.S. Appl. No. 12/987,982, filed Jan. 10, 2011.
U.S. Appl. No. 61/408,737, filed Nov. 1, 2010.
U.S. Appl. No. 61/427,173, filed Dec. 24, 2010.
U.S. Appl. No. 61/539,884, filed Sep. 27, 2011.
Petition for Inter Partes Review, Case IPR2019-01011, U.S. Pat. No. 9,633,373 by Apple (Apr. 24, 2019).
Petition for Inter Partes Review, Case IPR2019-01012, U.S. Pat. No. 9,779,419 by Apple Inc. (Apr. 24, 2019).
Petition for Inter Partes Review, Case IPR2019-00611, U.S. Pat. No. 8,831,557 by Apple and Samsung (Jan. 23, 2019).
Petition for Inter Partes Review, Case IPR2019-00612, U.S. Pat. No. 8,831,557 by Apple and Samsung (Jan. 23, 2019).
Petition for Inter Partes Review, Case IPR2019-00613, U.S. Pat. No. 9,633,373 by Apple Inc. (Jan. 23, 2019).
Petition for Inter Partes Review, Case IPR2019-00614, U.S. Pat. No. 9,779,419 by Apple Inc. (Jan. 23, 2019).
Apple Inc.'s Motion for Leave to Amend Invalidity Contentions, Case 3:18-cv-02245-JD, Documents 63-65.9 (filed Feb. 2, 2019).
Apple Inc.'s Invalidity Contentions, Case No. 3:18-cv-02245-JD (Nov. 6, 2018).
"AT&T reveals pricing, release date for Motorola Atrix 4G," Bonnie Cha, cnet.com, Feb. 3, 2011 (available at https://www.cnet.com/news/at-t-reveals-pricing-releasedate-for-motorola-atrix-4g/) (last checked Oct. 22, 2018).
Cnet CES 2011 Video Review, Jan. 14, 2011 (available at https://www.cnet.com/videos/motorola-atrix-4g-with-laptop-dock/ and https://www.youtube.com/watch?v=GkJp_sLYbeM) (last checked Oct. 22, 2018).
"AT&T gets official with Motorola Atrix 4G pricing, release date," Rachel King, ZDNet.com, Feb. 3, 2011 (available at https://www.zdnet.com/article/at-t-getsofficial-with-motorola-atrix-4g-pricing-release-date/) (last checked Oct. 22, 2018).
"It's official: Motorola pushes up Atrix 4G launch to Feb. 22," Joseph Flatley, engadget.com, Feb. 17, 2011 (available at https://www.engadget.com/2011/02/17/itsofficial-motorola-pushes-up-atrix-4g-launch-to-feb-22/) (last checked Oct. 22, 2018).
"Motorola Atrix 4G (AT&T)," Sascha Segan and Jamie Lendino, pcmag.com, Aug. 8, 2011, available at https://www.pcmag.eom/article2/0,2817,2379916,00.asp) (last checked Oct. 22, 2018).
"ATRIX—Fingerprint Smart Sensor," Motorola.com (available at https://support.motorola.com/in/en/solution/MS63688) (last checked Oct. 22, 2018) ("Motorola Fingerprint Sensor Guide").
Motorola Atrix™ 4G User's Guide, 2011 (available at https://www.att.com/ecms/dam/att/consumer/support/landingpage/userguides/retired/smartphone/Motorola_ATRIX_4G.pdf (last checked Oct. 22, 2018) ("User Guide").
"AT&T to release Motorola Atrix 4G on March 6., pre-sales Feb. 13; $199.99", Andrew Munchbach, Wall Street Journal, Feb. 3, 2011.
"The World's Most Significant New Smartphone," Ken Werner, displaydailys.com, Jan. 13, 2011 (available at https://web.archive.org/web/20110123061805/http://displaydaily.com/2011/01/13/

(56) References Cited

OTHER PUBLICATIONS theworlds-most-significant-new-smart-phone (last checked Oct. 22, 2018) ("Significant Smartphone Article").
"Android Atrix News: Motorola Atrix 4G Presales start Feb. 13 Available Mar. 6", Wireless and Mobile News, Feb. 3, 2011.
"AT&T Announces the World's Most Powerful Smartphone, the Motorola ATRIX 4G, Will be Available for Preorder on Feb. 13", PR Newswire, Feb. 3, 2011.
"AT&T Debuts Motorola Atrix 4G", Sascha Segan, PC Magazine. com, Jan. 5, 2011.
"AT&T News: Motorola Atrix On Sale Feb. 22 Preorders Delivered Feb. 21", Wireless and Mobile News, Feb. 17, 2011.
"AT&T Begins Pre-sales for Motorola ATRIX 4G on Feb. 13", RTT News, Feb. 3, 2011.
"Motorola Mobility and AT&T Announce ATRIX 4G, the Future of Mobile Computing", PR Newswire, Jan. 5, 2011.
"Review: AT&T Motorola Atrix 4G", The News & Observer, Raleigh, North Carolina, 40,676.
"Motorola Atrix 4G Smartphone Review", Shelly Palmer Digital Living, Dec. 1, 2012.
"Motorola Atrix 4G Review", Joshua Topolsky, Engadget, Feb. 14, 2011 ("Engadget Review").
"Looking for our Motorola Atrixt 4G Review?", Joshua Topolsky, Engadget, Feb. 9, 2011.
"It's got the POWER", Gregory Loo, The New Paper, Jul. 23, 2011.
"Review: Motorola Atrix 4G blurs line between laptop and smart-phone", Bridget Carey, The Miami Herald, Mar. 8, 2011.
"Apple Announces the New iPhone 3GS—The Fastest, Most Powerful iPhone Yet," apple.com Press Release, Jun. 8, 2009, available at apple.com Press Release, Jun. 8, 2009, available at https://www.apple.com/newsroom/2009/06/08Apple-Announces-the-New-iPhone-3GSThe-Fastest-Most-Powerful-iPhone-Yet/ (last checked Nov. 5, 2018).
"iPhone 3GS announced: $199 16GB, $299 32 GB, Jun. 19," Nilay Patel, engadget.com, Jun. 8, 2009, available at https://www.engadget.com/2009/06/08/iphone-3gs-announced/ (last checked Nov. 5, 2018).
My iPhone (4th Ed.) ("iPhone Miser"), by Brad Miser and published by Que Publishing, was published at least by Dec. 31, 2011, and on information and belief was published prior to Apr. 30, 2011.
The iPhone Book (2d Ed.) ("iPhone Kelby"), by Scott Kelby and Terry White and published by Peachpit Press, was published at least by Dec. 31, 2009.
IPhone 3G Portable Genius ("iPhone McFedries"), by Paul McFedries and David Pabian and published by Wiley Publishing, Inc., was published at least by Dec. 31, 2008.
IPhone—The Missing Manual (2d Ed.) ("iPhone Pogue"), by David Pogue and published by O'Reilly Media, Inc., was published at least by Dec. 31, 2008.
Fujitsu LifeBook P1620 (downloaded from https://www.cnet.com/products/fujitsu-lifebookp1620/specs/ on Nov. 6, 2018).
Yuuko Tanaka "Pocket Encyclopedia, Book for Understanding iPad2", Shoeisha Co., Ltd.,—19 pages (Jun. 16, 2011).
Fujitsu LifeBook P1620 Tablet PC Review (downloaded from http://www.tabletpcreview.com/tabletreview/fujitsu-lifebook-p1620-tablet-pc-review/) (Feb. 26, 2008).
Fujitsu LifeBook P Series BIOS Guide (downloaded from http://www.fujitsupc.com/www/content/pdf/SupportGuides/P1620_BIOS_Guide_FPC58-1917-01_rA.pdf) (Jan. 29, 2008).
Fujitsu User's Guide—Learn how to use your Fujitsu P1620 notebook (downloaded from http://www.fujitsupc.com/www/content/pdf/SupportGuides/P1620_UG_B5FJ-6461-01EN-00%20rA.pdf) (Dec. 31, 2007).
The Fujitsu Lifebook P1620: Windows Air? (downloaded from https://www.tomsguide.com/us/fujitsu-lifebook-p1620,review-1065.html) (Feb. 28, 2008).
Acer Tempo M900 (downloaded from https://www.techradar.com/reviews/phones/mobilephones/acer-tempo-m900-617808/review) (Jul. 20, 2009).
Acer Tempo M900 (downloaded from https://www.zdnet.com/product/acer-tempo-m900/) (Jul. 27, 2009).
Acer Tempo M900 Review (downloaded from http://www.brighthand.com/phonereview/acertempo-m900-review/) (Sep. 17, 2009).
Acer M900 Review (downloaded from http://www.knowyourmobile.com/acer/5073/acerm900-review) (Jul. 2, 2009).
Acer M900 User Guide (downloaded from https://globaldownload.acer.com/GDFiles/Document/User%20Manual/User%20Manual_Acer_1.0_A_M900.zip?acerid=633785735377403109) (Mar. 2009).
U.S. Patent Application for Method and Apparatus To Take Emergency Actions When a Device is Shaken Rapidly by its User, filed Dec. 24, 2010.
U.S. Patent Application for Intelligent Automated Assistant (received from Samsung in relation to Invalidity Contentions dated Nov. 6, 2018 in a lawsuit before U.S. District Court, Northern District of California, Case No. 3:18-cv-02243-JD).
U.S. Patent Application for Mobile Device (received from Samsung in relation to Invalidity Contentions dated Nov. 6, 2018 in a lawsuit before U.S. District Court, Northern District of California, Case No. 3:18-cv-02243-JD).
U.S. Patent Application for Methods of Using Tactile Force Sensing for Intuitive User Interface (received from Samsung in relation to Invalidity Contentions dated Nov. 6, 2018 in a lawsuit before U.S. District Court, Northern District of California, Case No. 3:18-cv-02243-JD).
Daniel Robinson, Vendors Unveil Latest Handsets (Feb. 19, 2017).
Toshiba offers enterprise handset, Mist News (Feb. 13, 2007).
Atrua Fingerprint Touch Controls Enable Data Protection and Usability Enhancements in Toshiba 3G Phones; First Fingerprint Phones for Europe Include Innovative Touch Scrolling Feature, Market Wire (Feb. 12, 2007).
Toshiba Portege G900 (Apr. 11, 2007).
Toshiba G9000: Guide Specification Three Phase Uninterruptible Power Supply (received from Samsung in relation to Invalidity Contentions dated Nov. 6, 2018 in a lawsuit before U.S. District Court, Northern District of California, Case No. 3:18-cv-02243-JD).
Toshiba G9000 Series: Installation and Operation Manual (Jan. 2013).
Motorola Atrix™ Manual (2011).
Motorola Atrix™ 4G Quickstart (2011).
Zach Epstein, Acer announces Tempo line of smartphones: X960, F900, M900 and DX900, <http://bgr.com/2009/02/16/acer-announces-tempo-line-of-smartphones-x960-f900-m900-and-dx900/> (Feb. 16, 2009).
Erica Ogg, Acer smartphone launching Feb. 16, <https://www.cnet.com/news/acer-smartphone-launching-feb-16/>(Jan. 28, 2009).
PDA Phone User Manual (2007).
PDA Phone User Manual (2008).
Arne Hess, Announced: HTC Announces the HTC P6500 Vertical Market Windows Mobile Smartphone, <http://www.theunwired.net/index.php?item=announced-htc-announces-the-htc-p6500-vertical-market-windows-mobile-smartphone> (Jan. 10, 2007).
Arne Hess, Unveiled: AT&T and LG Announces the LG Expo GW820 Windows Mobile Smartphone, <http://www.theunwired.net/?item=unveiled-att-and-lg-announces-the-lg-expo-gw820-windows-mobile-smartphone&5219 (Nov. 30, 2009).
LG eXpo™ Frequently Used applications (2009).
LG eXpo™ Specifications (2009).
LG eXpo™ Quickstart (2009).
Pantech User Manual (received from Samsung in relation to Invalidity Contentions dated Nov. 6, 2018 in a lawsuit before U.S. District Court, Northern District of California, Case No. 3:18-cv-02243-JD).
Pantech launches world's first fingerprint recognition mobile phone with 1.3 mega pixels camera, Middle East Company News Wire (Dec. 1, 2004).
Pantech launches fingerprint-recognition mobile phones; New Products; Pantech Co., Pantech GI100; Brief Article (Dec. 1, 2004).
Pantech to Unveil the World First Fingerprint Recognition Mobile phone w/Mega Pixel Camera, <http://www.pantech.co.kr/en/promotion/coverageView.do> (Mar. 2, 2006).
Chinse Telecom Fair Opens Tuesday, Korea Times (Oct. 26, 2004).
Pantech Launches Korea's First Smartphone with Introduction of PH-S8000T, In Partnership with Micro, <http://www.pantech.co.kr/en/promotion/coverageView.do> (Mar. 3, 2006).

(56) References Cited

OTHER PUBLICATIONS

Adrian Baschnonga, Pantech Launches Fingerprint-Recognition Handset, HIS Global Insight (Aug. 3, 2004).
Nokia N8-00 User Guide, Issue 2.1 (2011).
Samsung Galaxy S™ II Mobile Phone User Manual (2011).
IPhone Finger Tips: Quick Start Guide (2011).
IPhone User Guide For iOS 5.0 Software (2011).
Apple Launches iPhone 4S, iOS 5 & iCloud, <https://www.apple.com/newsroom/2011/10/04Apple-Launches-iPhone-4S-iOS-5-iCloud/> (Oct. 4, 2011).
New Hitachi Mobile Phone Uses AuthenTec Fingerprint Sensor for Security and Handset Navigation, Business Wire (Apr. 25, 2007).
Samsung Electronics America, Inc. and Samsung Electronics Co., Ltd.'s NDCA Local Rule 3-3 and 3-4 Disclosures (Invalidity Contentions), Case No. 3:18-cv-02243-JD (Nov. 6, 2018.
Video Clip of cnet First Look from CES 2011 for Motorola Atrix 4G (received from Samsung in relation to Invalidity Contentions dated Nov. 6, 2018 in a lawsuit before U.S. District Court, Northern District of California, Case No. 3:18-cv-02243-JD). Video clip was submitted via DVD in the parent U.S. Appl. No. 15/938,702, and the file name of the video clip is SAMSUNG-0015905.mp4.
Photographs of Motorola Atrix 4G (received from Samsung in relation to Invalidity Contentions dated Nov. 6, 2018 in a lawsuit before U.S. District Court, Northern District of California, Case No. 3:18-cv-02243-JD). Photographs were submitted via DVD in the parent U.S. Appl. No. 15/938,702, and the file name of the video clip is SAMSUNG-0014566.zip.
Photographs of Apple iPhone 3GS (received from Samsung in relation to Invalidity Contentions dated Nov. 6, 2018 in a lawsuit before U.S. District Court, Northern District of California, Case No. 3:18-cv-02243-JD). Photographs submitted via DVD in the parent U.S. Appl. No. 15/938,702, and the file name of the video clip is SAMSUNG-0022542.zip.
F-12C Instruction Manual '11.7, NTT Docomo, Inc., 1st Edition, and its English Translation, <https//www.nttdocomo.co.jp/binary/pdf/support/manual/F / 12C_J_OP_All.pdf>—172 pages (Jul. 2011).
Office Action of corresponding Japanese Patent Application No. 2018-85712 and its English Translation—dated Dec. 3, 2019 (26 pages).

\* cited by examiner

US 11,551,263 B2

ACTIVATING DISPLAY AND PERFORMING ADDITIONAL FUNCTION IN MOBILE TERMINAL WITH ONE-TIME USER INPUT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosure relates to a method and mobile communication terminal for performing a specific function when a mobile communication terminal is activated, and more particularly to a method and mobile communication terminal for performing various functions according to the number of presses or a press time of a button for switching from an inactive state to an active state.

Description of the Related Art

Recently, various terminals, for example, such as smart phones, mobile phones, personal digital assistants (PDAs), and web pads, having not only communication functions but also various other functions have come into wide use. These terminals have rapidly been generalized because not only can an environment identical or similar to a desktop computer be implemented anytime and anywhere on the above-described terminals, but they also include a telephone function.

At present, in order to operate a corresponding function among various functions included in a terminal such as those described above, a certain operation should be performed in a state in which the terminal is in an active state, that is, in a state in which a display is turned on. In addition, in order to add a certain function, an interface or button for performing the function should be added to the terminal. For example, it is possible to transmit a rescue signal indicating an emergency or urgent situation by pressing an emergency button only when the emergency button for the urgent situation is separately added.

On the other hand, users of the terminals described above perform operations of habitually taking out and activating the terminals on the move or in a standby state while carrying the terminals.

SUMMARY

According to an embodiment, there is provided a mobile communication terminal comprising: a display unit including a touch screen capable of receiving user's input through the touch screen for controlling the mobile communication terminal; a memory unit; a communication unit; and an activation sensing unit, wherein the activation sensing unit detects a change from an inactive state of the mobile communication terminal to an active state of the mobile communication terminal, wherein the inactive state is defined that the display unit being turned off while the mobile communication terminal being communicable and the active state is defined that the display unit being turned on while the mobile communication terminal being communicable, wherein the mobile communication terminal performs a predetermined operation by an application of the mobile communication terminal when the activation sensing unit detects the change from the inactive state to the active state.

According to an another embodiment, there is provided a method for performing a specific function when a mobile communication terminal is activated, the method comprising: sensing a change from an inactive state of the mobile communication terminal to an active state of the mobile communication terminal, wherein the inactive state is defined that a display unit being turned off while the mobile communication terminal being communicable, wherein the active state is defined that a display unit being turned on while the mobile communication terminal being communicable; and performing a predetermined operation by an application of the mobile communication terminal when the mobile communication terminal changes from the inactive state to the active state.

BRIEF DESCRIPTION OF THE DRAWINGS

Embodiments are described in further detail below with reference to the accompanying drawings. It should be understood that various aspects of the drawings may have been exaggerated for clarity.

DETAILED DESCRIPTION

Figure 1:
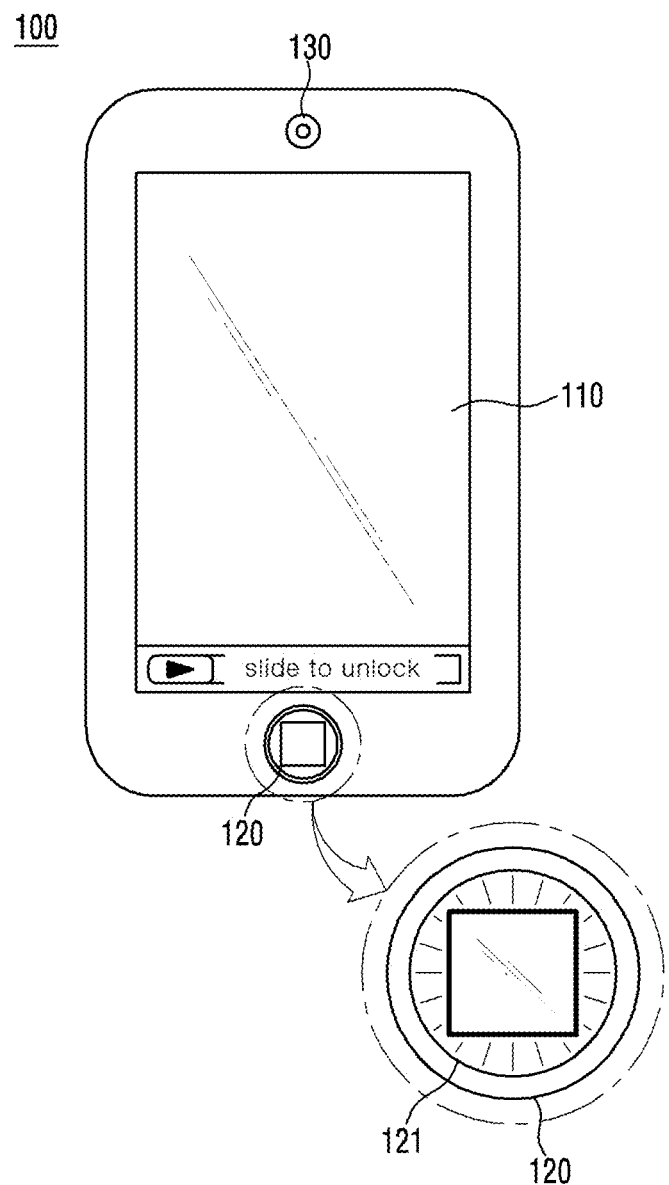
FIG. 1 is a diagram illustrating an external appearance of a mobile communication terminal according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the present invention. Also, it is to be understood that the positions or arrangements of individual elements in the embodiment may be changed without separating the spirit and scope of the present invention. The following detailed description is, therefore, not to be taken in a limiting sense, and the scope of the present invention is defined only by the appended claims that should be appropriately interpreted along with the full range of equivalents to which the claims are entitled. In the drawings, like reference numerals identify like or similar elements or functions through the several views.

Hereinafter, embodiments of the present invention will be explained in detail with reference to the accompanying drawing so that those skilled in the art can easily practice the invention.

Terms

The term "mobile communication terminal" used herein refers to a digital device that includes a memory means and a microprocessor with computing capability as in a mobile phone, a navigation system, a web pad, a PDA, a workstation, a personal computer (for example, a notebook computer or the like) as a digital device including wired/wireless communication functions or other functions. Although an example of the mobile communication terminal (for example, a mobile phone) will be described in part of this specification, the present invention is not limited thereto.

The term "inactive state" used herein refers to a state in which the mobile communication terminal is communicable but a display screen is turned off. Even when the display screen is turned off, a predetermined function (for example, a music play function or the like) is operable. As described above, the term "inactive state" used herein refers to a concept encompassing states in which the display screen is turned off, regardless of whether or not the mobile communication terminal performs a predetermined operation. However, a state in which the mobile communication terminal is completely turned off is excluded.

The term "active state" used herein refers to a state in which the display screen of the mobile communication terminal is turned on. Switching from the "inactive state" to the "active state" refers to switching of the display screen from the OFF state to the ON state, regardless of information displayed on the display screen in the ON state. For example, the mobile communication terminal can be determined to be in the "active state" even when only a lock screen is displayed.

Mobile Communication Terminal

FIG. 1 is a diagram illustrating an external appearance of the mobile communication terminal according to an embodiment of the present invention.

Referring to FIG. 1, the mobile communication terminal 100 according to this embodiment can include a display unit 110 and an activation button 120. The mobile communication terminal 100 can further include a camera 130.

Although the display unit 110 is provided on the front side of a frame constituting the mobile communication terminal 100, the activation button 120 is provided on a lower part of the display unit 110, and the camera 130 is provided on an upper part of the display unit 110 as illustrated in FIG. 1, other forms may be configured. For example, the display unit 110 need not necessarily be formed on the entire surface of the mobile communication terminal 100. That is, the display unit 110 is only required to be formed on at least part of the mobile communication terminal 100, and the activation button 120 is only required to be formed on a part different from that of the display unit 110. In addition, the camera 130 can be formed on the other side on which the display unit 110 is not provided in the mobile communication terminal 100.

The display unit 110 displays various information regarding operation states of the mobile communication terminal 100, and also displays an interface for a user's input if the mobile communication terminal 100 drives a touch screen. In general, if a state in which the user's operation on the mobile communication terminal 100 is absent continues for a predetermined period of time, the mobile communication terminal 100 is in the inactive state. The user's operation refers to an input through the interface displayed on the display unit 110, an operation through the button 120, or an operation through a function key (for example, a volume control key or the like). A condition in which the inactive state is reached can be set by the user. For example, the condition can be set using a setting menu through the interface displayed on the display unit 110. On the other hand, the state can be switched to the inactive state by pressing another button (for example, an ON/OFF button) provided on the mobile communication terminal 100. For example, the mobile communication terminal 100 can be completely turned off if the ON/OFF button is pressed for a long time when the mobile communication terminal 100 is in the active state, but the mobile communication terminal 100 can be in the inactive state as a communicable state in which a phone call can be received if the ON/OFF button is pressed for a short time.

The activation button 120 is means for switching the mobile communication terminal 100 from the inactive state to the active state. That is, if the user presses the activation button 120 when the mobile communication terminal 100 is in the inactive state, switching to the active state is performed. FIG. 1 illustrates a state in which a lock screen is displayed on the display unit 110 after pressing the activation button 120 when the mobile communication terminal 100 is in the inactive state. However, the activation button 120 can function as means for another operation (for example, means for moving to a standby screen while a certain operation state is displayed on the display unit 110 or means for displaying a list of programs currently being operated).

According to an embodiment of the present invention, if the user presses the activation button 120 when the mobile communication terminal 100 is in the inactive state, the mobile communication terminal 100 performs a predetermined operation in addition to switching to the active state. For example, image information is displayed on a lock screen of the display unit 110 when the predetermined operation is being performed. The image information is displayed on a lock screen of the display unit when the predetermined operation is being performed. The lock screen is configured to be displayed when the mobile communication terminal 100 changes from the inactive state to the active state. The display unit 110 can provide an unlock means on a part of the display unit 110 when the predetermined operation is being performed.

When the mobile communication terminal 100 is in the inactive state, the user can set an operation to be performed by pressing the activation button 120. For example, an operation of the mobile communication terminal 100 connected to the activation button 120 can be set using a setting menu through the interface displayed on the display unit 110. In addition, according to an embodiment of the present invention, an operation which differs according to the number of presses or a press time of the activation button 120 can be performed when the mobile communication terminal 100 is in the inactive state. For example, a first operation can be set to be performed if the activation button 120 is pressed once, and a second operation can be set to be performed if the activation button 120 is continuously pressed three times. In addition, as another example, the first operation can be set to be performed if the activation button 120 is pressed once for a short time, and the second operation can be set to be performed if the activation button 120 is pressed once for a long time. The mobile communication terminal 120 can include a predetermined clock circuit or timer to calculate the cumulative number of continuous presses of the activation button 120 and measure a period of time for which the activation button 120 is pressed. For example, the number of presses is determined to be two if the activation button 120 is re-pressed within a threshold time after one press. If the activation button 120 is pressed for the threshold time or more, a long press of the activation button 120 can be determined. Operations capable of being performed by pressing the activation button 120 in the inactive state will be described later.

According to an embodiment of the present invention, a sub-display unit 121 can be provided on the activation button 120. Information regarding an operation to be performed by pressing the activation button 120 can be displayed on the sub-display unit 121. Various types such as a shape, a character, a graphic, and color can be displayed. When the display type is the shape, a circle, a triangle, a rectangle, a hexagon, or the like can be displayed. For example, the circle can be displayed on the sub-display unit 121 when the first operation is set to be performed by pressing the activation button 120, and the triangle can be displayed on the sub-display unit 121 when the second operation is set to be performed by pressing the activation button 120, and vice versa. A display type of the sub-display unit 121 and a correspondence relationship between operations and displays can also be set by the user. For example, the user can select the first operation as the operation to be performed by pressing the activation button 120 from a setting menu and select the triangle as the display type of the sub-display unit 121 of the activation button 120. Accordingly, the user can recognize that the first operation is performed when the user has pressed the activation button 120 because the triangle is displayed on the sub-display unit 121 even when the mobile communication terminal 100 is in the inactive state.

Although the sub-display unit 121 can be implemented by a general display such as liquid crystal, a liquid crystal display (LCD), or a light emitting diode (LED), the present invention is not limited thereto.

An operation of controlling driving of the display unit 110 and the sub-display unit 121 can be performed in the same processor and the same method or in different processors and different methods.

Hereinafter, various embodiments for operations of the mobile communication terminal 100 capable of being performed by pressing the activation button 120 will be described.

Operations Through Activation Button

Operations to be described below can be performed by pressing the activation button 120 when the mobile communication terminal 100 is in the inactive state, and set by the user. The operations described below are only examples. Of course, other operations can be performed by pressing the activation button 120.

1. Camera Activation Function

When the mobile communication terminal 100 is in the inactive state, the camera 130 provided in the mobile communication terminal 100 can be activated by pressing the activation button 120, and a screen currently imaged by the camera 130 can be displayed on the display unit 110.

Figure 2:
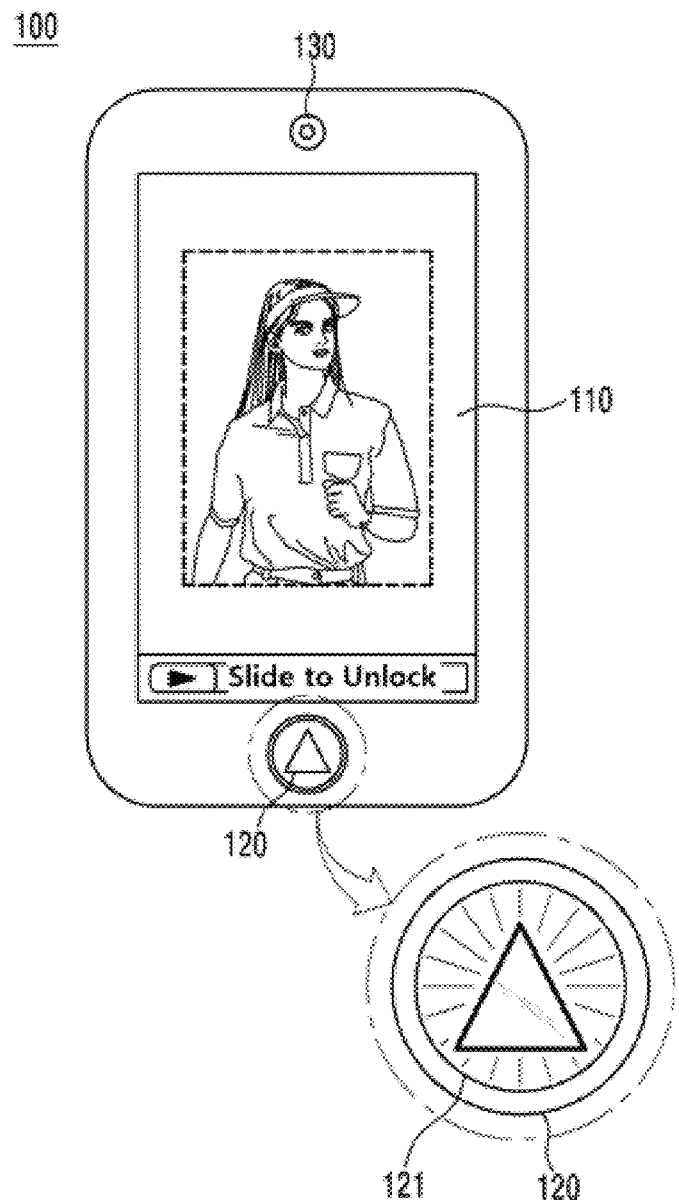
FIG. 2 is a diagram illustrating an example of an operation of the mobile communication terminal when an activation button has been pressed according to an embodiment of the present invention.

FIG. 2 is a diagram illustrating an example in which the camera 130 is activated after the activation button 120 is pressed and an imaged scene is displayed on the display unit 110.

2. Health Sensing and Health Information Transmission Functions

When the mobile communication terminal 100 is in the inactive state, the health sensing function can be driven, so that sensed health information can be transmitted to a medical authority such as a doctor or a protector.

Figure 3A:
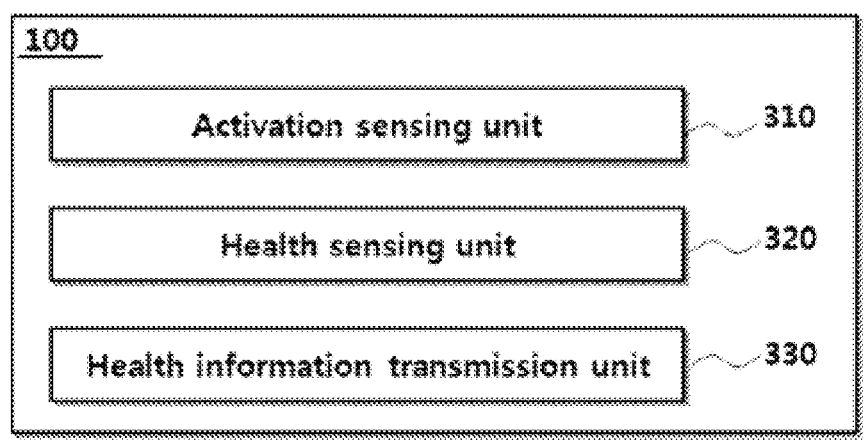
FIGS. 3A and 3B are block diagrams illustrating the operation of the mobile communication terminal according to an embodiment of the present invention.
Figure 3B:
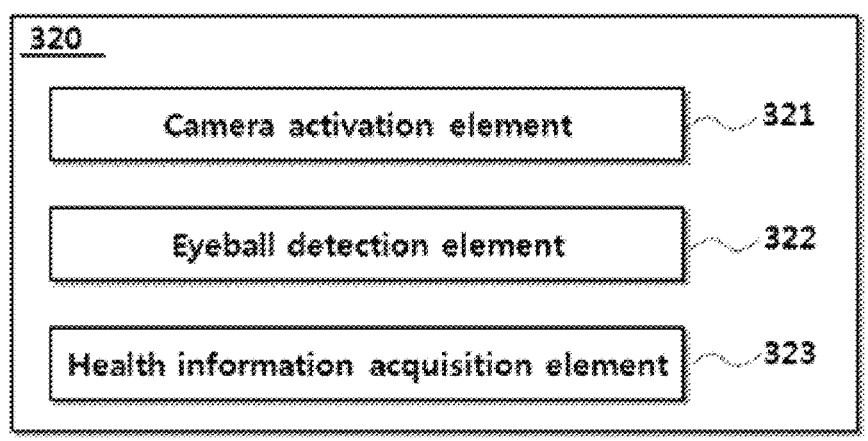

FIGS. 3A and 3B are block diagrams of the mobile communication terminal 100 illustrating the above-described functions. FIGS. 3A and 3B illustrate functional block diagrams illustrating the above-described functions of the mobile communication terminal 100.

Referring to FIG. 3A, the mobile communication terminal 100 can include an activation sensing unit 310, a health sensing unit 320, and a health information transmission unit 330.

When the mobile communication terminal 100 is in the inactive state, the activation sensing unit 310 senses whether or not the user has pressed the activation button 120.

The health sensing unit 320 is operated when the activation sensing unit 310 has sensed that the activation button 120 has been pressed, and senses a health state of the user in various methods.

FIG. 3B is a block diagram illustrating an example of the health sensing unit 320. Referring to FIG. 3B, the health sensing unit 320 can include a camera activation element 321, an eyeball detection element 322, and a health information acquisition element 323.

The camera activation element 321 activates the camera 130 provided in the mobile communication terminal 100. According to the activation of the camera 130, a video currently captured by the camera 130 is displayed on the display unit 110. If an eye or face of the user is imaged by the camera 130, the eyeball detection element 322 performs a function of recognizing and extracting an eyeball of the user. A general eyeball detection algorithm can be used for eyeball detection. The health information acquisition element 323 acquires various health information through the eyeball detected through the eyeball detection element 322. It is possible to recognize a stress index, a diabetes index, or retinal diseases of the user through a color or health state of the eyeball. A well-known algorithm in the related art can be used as an algorithm for detecting health information from characteristics of the detected eyeball.

The health information acquired as described above can be transmitted by the health information transmission unit 330 to the mobile communication terminal of a protector, a medical authority such as a doctor or the like, or a predetermined server. Information regarding the protector (for example, a phone number or an e-mail address) can be stored in advance. The acquired health information can be displayed on the display unit 110 so that the user can check the acquired health information.

The above-described operations, that is, the eyeball detection function and the health sensing function based on information regarding the detected eyeball, can be performed by installing a predetermined application. That is, the application includes an eyeball detection algorithm and a health sensing algorithm, so that the operations as described above can be performed by installing the application in the mobile communication terminal 100. The user can download this application and install the downloaded application in the mobile communication terminal 100. In addition, although an example of only health sensing through eyeball detection has been described above, it is possible to install an application, for example, for health sensing through face detection, and connect the application to the activation button 120. The user can use the functions as described above by setting the application to be operated immediately when the activation button 120 is pressed through the setting menu in the inactive state of the mobile communication terminal 100.

In general, aged persons may not use the health sensing function due to a difficult operation even when the health sensing function is provided in the mobile communication terminal 100. However, according to the above-described embodiment of the present invention, the health sensing function is operated only by pressing the activation button 120 without a special operation. Accordingly, it is possible to easily check health information and transmit the health information to a protector or a doctor.

3. User Identification Function

When the mobile communication terminal 100 is in the inactive state, a user authentication process can be performed for security by pressing the activation button 120.

Figure 4A:
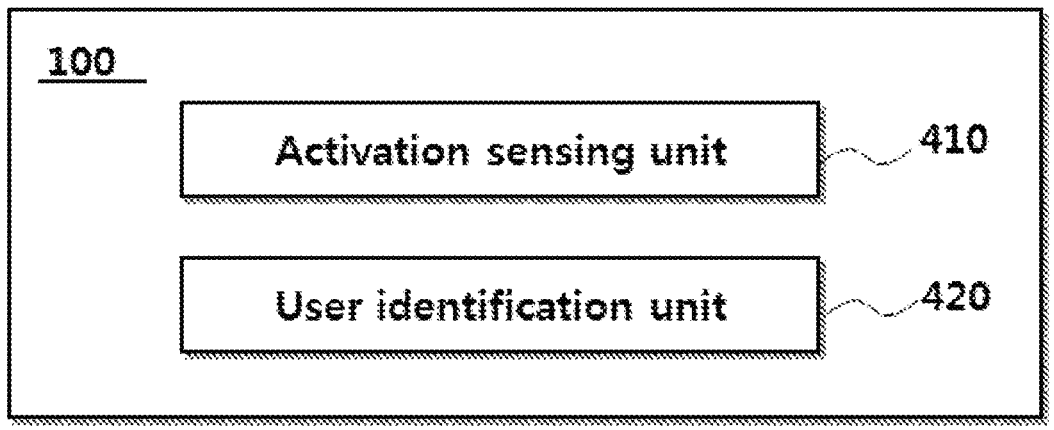
FIGS. 4A and 4B are block diagrams illustrating the operation of the mobile communication terminal according to another embodiment of the present invention.
Figure 4B:
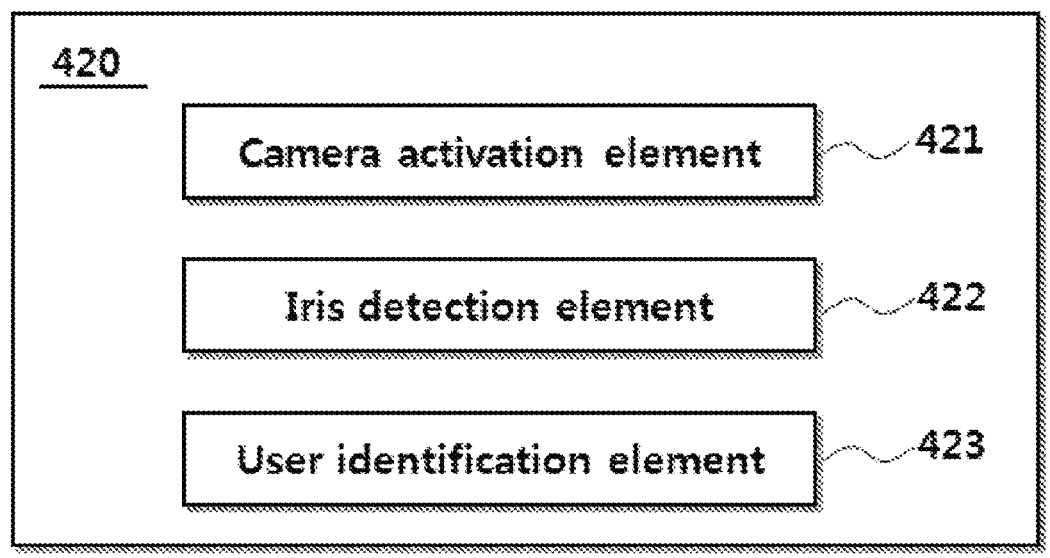

FIGS. 4A and 4B illustrate block diagrams of the mobile communication terminal 100 illustrating the above-described functions. Referring to FIG. 4A, the mobile communication terminal 100 can include an activation sensing unit 410 and a user identification unit 420.

When the mobile communication terminal 100 is in the inactive state, the activation sensing unit 410 senses whether or not the user has pressed the activation button 120.

If the activation sensing unit 410 senses that the activation button 120 has been pressed, the user identification unit 420 operates the user identification function in various methods.

FIG. 4B is a block diagram illustrating an example of the user identification unit 420. Referring to FIG. 4B, the user identification unit 420 can include a camera activation element 421, an iris detection element 422, and a user identification element 423.

The camera activation element 421 activates the camera 130 provided in the mobile communication terminal 100. According to the activation of the camera 130, a video currently captured by the camera 130 is displayed on the display unit 110. If an eye or face of the user is imaged by the camera 130, the iris detection element 422 performs a function of recognizing and extracting an iris from an eyeball of the user. A general iris detection algorithm can be used for iris recognition. The user identification element 423 performs a function of comparing the iris detected by the iris detection element 422 to pre-stored iris information of the user, and authenticating the current user as a true user if the two match. For this, the user identification element 423 can use iris information of the user pre-stored in a database. The iris information of the user can be stored by registering information regarding the iris detected by the iris detection element 422 using a video of the true user first captured by the camera 130. Predetermined identification information (for example, an identifier (ID), a password, a social security number, or the like) should be input to change the registered iris information of the true user. If the user identification element 423 authenticates the current user as the true user, the lock state of the mobile communication terminal 100 is released and all functions are available. If the current user is not authenticated as the true user, the lock state continues along with a display of an alarm message.

The above-described operations, that is, the iris detection function, the user identification function, and the user authentication function, can be performed by installing a predetermined application. That is, the application includes the iris detection algorithm and the authentication algorithm based on an iris comparison, so that the operations as described above can be performed by installing the application in the mobile communication terminal 100. The user can download this application and install the downloaded application in the mobile communication terminal 100. The user can use the functions as described above by setting the application to be operated immediately when the activation button 120 is pressed through the setting menu in the inactive state of the mobile communication terminal 100.

Accordingly, it is possible to efficiently reduce security risks by setting the user authentication process to be performed through a separate setting, that is, by pressing the activation button 120, when the mobile communication terminal 100 is used in a region vulnerable to the security risks.

Although an example of an authentication method through iris recognition has been described above, other authentication methods, for example, an authentication key matching method, a password matching method, a face recognition method, a fingerprint recognition method, and the like, can be used. That is, one or more authentication methods can be performed by pressing the activation button 120.

4. Location Information Transmission Function

When the mobile communication terminal 100 is in the inactive state, collected location information can be transmitted to a protector or a protection authority (a police station or a fire station) by pressing the activation button 120.

Figure 5:
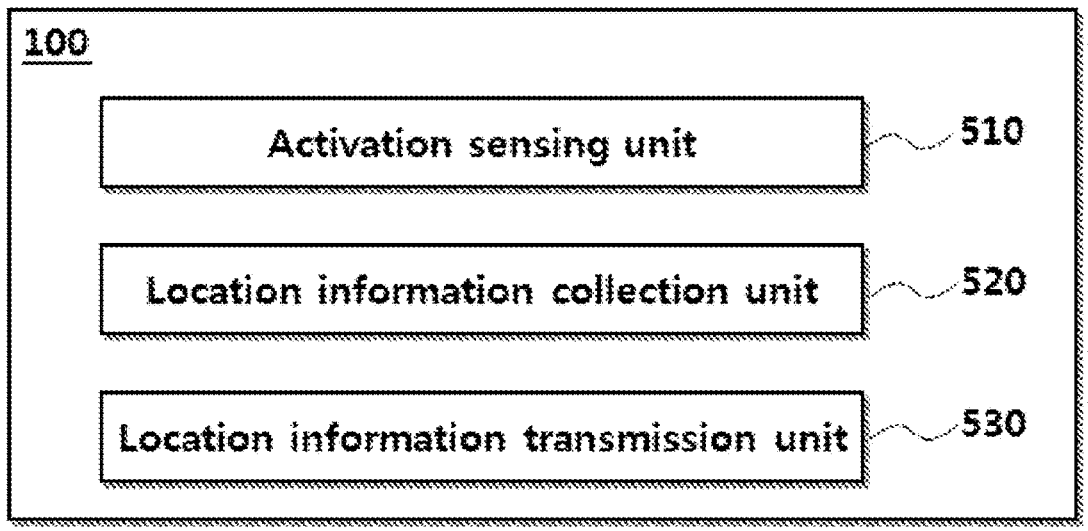
FIG. 5 is a block diagram illustrating the operation of the mobile communication terminal according to still another embodiment of the present invention.

FIG. 5 illustrates a block diagram of the mobile communication terminal 100 illustrating the above-described function. Referring to FIG. 5, the mobile communication terminal 100 can include an activation sensing unit 510, a location information collection unit 520, and a location information transmission unit 530.

When the mobile communication terminal 100 is in the inactive state, the activation sensing unit 510 senses whether or not the user has pressed the activation button 120.

When the activation sensing unit 510 senses that the activation button 120 has been pressed, the location information collection unit 520 collects a current location using a global positioning system (GPS) sensor or other location sensors.

The location information transmission unit 530 performs a function of transmitting location information collected by the location information collection unit 520 to a protector or a protection authority. In an urgent situation, a message indicating the urgent situation can be transmitted along with the location information. The location information and the urgent message can be optionally transmitted. On the other hand, this operation may differ according to the number of presses or a press time of the activation button 120. For example, it is possible to set an operation of transmitting the urgent message to a police station along with the location information when the activation button 120 is pressed for a short time, and set an operation of transmitting only the location information to the protector when the activation button 120 is pressed for a long time. In addition, as another example, it is possible to set an operation of transmitting the location information to the police station along with the urgent message when the activation button 120 is pressed once and set an operation of transmitting the location information to a fire station along with the urgent message when the activation button 120 is pressed three times.

The above-described operations can be performed by installing a predetermined application. That is, the application includes an algorithm for collecting location information and transmitting the collected located information along with an urgent message, so that the operations as described above can be performed by installing the application in the mobile communication terminal 100. The user can download this application and install the downloaded application in the mobile communication terminal 100. The user can use the functions as described above by setting the application to be operated immediately when the activation button 120 is pressed through the setting menu in the inactive state of the mobile communication terminal 100.

Accordingly, it is possible to efficiently escape a dangerous situation because the user can report the dangerous situation to a protector or a protection authority along with his/her location information with only a simple operation.

5. File Transmission Function

When the mobile communication terminal 100 is in the inactive state, a function of uploading content (for example, contact information, a photo, a moving image, or an application) included in the mobile communication terminal 100 to another mobile communication terminal 100 or a media space (for example, a personal media space such as Twitter, Facebook, or a blog or a community media space such as a café or club community) can be operated.

6. Mode Change During Drive

When the mobile communication terminal 100 is in the inactive state, the mobile communication terminal 100 can be switched to a hands-free function or some communication functions (a voice communication function, a short message service (SMS) function, and an Internet function) of the mobile communication terminal 100 can be interrupted by pressing the activation button 120.

Accordingly, it is possible to significantly reduce traffic accident risks by switching the mode of the mobile communication terminal 100 or interrupting the communication function with only a simple operation of pressing the activation button 120 during driving.

7. Advertisement Display Operation

When the mobile communication terminal 100 is in the inactive state, the activation button 120 is pressed so that an advertisement can be displayed on at least a part of the display unit 110. The advertisement display can be implemented by displaying an advertisement provided from an external server in real time, and driven by an advertisement-related application previously installed within the mobile communication terminal 100.

This application for enabling the advertisement to be displayed may be received in advance from an advertisement distribution server, an advertiser server, or a server for providing a service according to an embodiment of the present invention, that is, a service for driving a predetermined application according to a button input that switches the mobile communication terminal 100 from the inactive state to the active state.

An advertisement display method can be implemented by a method of randomly displaying advertisements of advertisers joining this service, a customized advertisement display method based on user information, and an advertisement display method based on a current location.

The user information can be pre-stored in a corresponding application and pre-transmitted to a server that provides an advertising service. On the other hand, location information collection necessary for the advertisement display method based on the current location can be used in conjunction with 4. Location Information Function described above. That is, current location information is collected simultaneously with the activation of the mobile communication terminal 100 and transmitted to an advertising-service providing server. Based on the current location information, advertisements related to the current location are distributed to the mobile communication terminal 100.

8. Other Application Operations

If a predetermined operation is performed in addition to switching to a simple active state by pressing the activation button 120 when the mobile communication terminal 100 is in the inactive state, this belongs to the scope of the present invention.

For example, an entertainment operation (for example, an operation of a music or video player, execution of a game application, or news reception) can be performed by pressing the activation button 120.

Operation Standby of Application

According to an embodiment of the present invention, the above-described predetermined applications are driven when the mobile communication terminal 100 is switched from the inactive state to the active state.

For this, when the mobile communication terminal 100 is in the inactive state, the applications should be maintained in an operation standby state. When the mobile communication terminal 100 is switched from the active state to the inactive state, the above-described applications can be in the operation standby state. That is, a selected application to be driven when the mobile communication terminal 100 is switched to the active state can be in the operation standby state when the mobile communication terminal 100 is switched to the inactive state.

However, a predetermined application operable when the mobile communication terminal 100 is switched from the inactive state to the active state regardless of the operation standby state or an operation disable state of the application belongs to the present invention.

Service Providing Server

Hereinafter, the service providing server according to an embodiment will be described.

Figure 6:
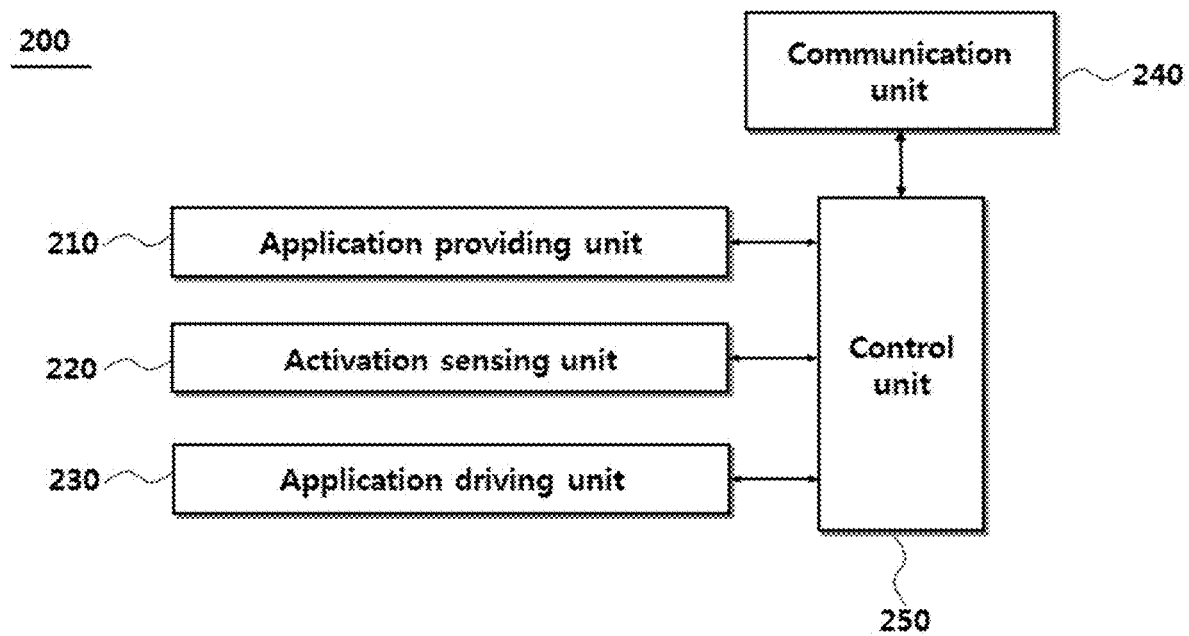
FIG. 6 is a diagram illustrating a configuration of a service providing system (server) for enabling a specific function to be operated when the mobile communication terminal is activated according to an embodiment of the present invention.

FIG. 6 is a diagram illustrating a configuration of a service providing system (server) for enabling a specific function to be operated when the mobile communication terminal is activated according to an embodiment of the present invention.

Referring to FIG. 6, the service providing server 200 can include an application providing unit 210, an activation sensing unit 220, an application driving unit 230, a communication unit 240, and a control unit 250. According to an embodiment of the present invention, the application providing unit 210, the activation sensing unit 220, the application driving unit 230, the communication unit 240, and the control unit 250 of the service providing server 200 can be program modules or hardware communicable with an external apparatus. The program modules or hardware can be included in the service providing server 200 or another apparatus communicable with the service providing server 200 in the form of an operation system, an application program module, and other program modules, and physically stored in various known storage apparatuses. On the other hand, these program modules or hardware include a routine, a sub routine, a program, an object, a component, and a data structure, each of which executes a specific task to be described later or specific abstract data, but the present invention is not limited thereto.

The application providing unit 210 enables the predetermined application described above to be transmitted to the mobile communication terminal 100. The user can receive a desired application by accessing the service providing server 200 through the mobile communication terminal 100, and install the received application within the mobile communication terminal 100. The application can include a control function of controlling a predetermined operation to be performed when the mobile communication terminal 100 is activated, and can independently perform the predetermined operation. For example, the application transmitted from the application providing unit 210 can be an application for enabling an advertisement to be displayed on the display unit 110 when the mobile communication terminal 100 is switched from the inactive state to the active state.

The activation sensing unit 220 according to an embodiment can sense the switching of the mobile communication terminal 100 from the inactive state to the active state. The user can transmit a signal indicating the activation of the mobile communication terminal 100 to the service providing server 200 by pressing the activation button of the mobile communication terminal 100.

The application driving unit 230 according to an embodiment enables a predetermined operation to be performed in the mobile communication terminal 100 when the activation of the mobile communication terminal 100 is sensed. That is, the application driving unit 230 drives a predetermined application within the mobile communication terminal 100 and enables a related screen to be displayed on the display unit 110. For example, if the activation of the mobile communication terminal 100 is sensed, an advertisement-related application can be executed. The application driving unit 230 can perform an additional operation related to driving of a corresponding application. For example, an application for enabling an advertisement to be displayed is driven to receive current location information and control advertisement information related to a corresponding location to be displayed on the display unit 110 of the mobile communication terminal 100. In addition, it is possible to collect user information (for example, a sex, an age, a region of residence, a matter of interest, and the like) and control advertisement information customized for a corresponding user to be displayed. Necessary advertisement information (for example, advertisement information to be transmitted to the mobile communication terminal 100 based on location information or user information) can be transmitted from an advertiser server or an advertisement distribution server. As described above, the application driving unit 230 can drive a predetermined application simultaneously with the activation within the mobile communication terminal 100 and perform an additional operation for optimally driving the application.

The communication unit 240 according to an embodiment makes information communication between the service providing server 200, the mobile communication terminal 100, and another apparatus possible. That is, the communication unit 240 can transmit an application to the mobile communication terminal 100 and receive an activation signal and information for driving the application from the mobile communication terminal 100.

The control unit 250 according to an embodiment can perform a function of controlling data flows between the application providing unit 210, the activation sensing unit 220, the application driving unit 230, and the communication unit 240. That is, the control unit 250 according to the embodiment can control the application providing unit 210, the activation sensing unit 220, the application driving unit 230, and the communication unit 240 to perform unique functions.

According to embodiments of the present invention, it is possible to enable an advantageous function to be utilized and improve an interest of a terminal user because various operations can be performed only by pressing an activation button when a terminal is in an inactive state.

According to embodiments of the present invention, it is possible to enable health check of an aged person to be performed with a simple operation and enable information regarding the health check to be transmitted to a protector or a medical authority.

According to embodiments of the present invention, it is possible to enable a user authentication process of which the security is enhanced to be operable with only a simple procedure.

According to embodiments of the present invention, it is possible to enable an urgent message to be transmitted along with location information with only a simple operation in an urgent situation.

The embodiments according to the present invention described above may be implemented in the form of program instructions that may be executed through various computer components and recorded on a computer-readable medium. The computer-readable medium may include program instructions, data files, data structures, and the like individually or in combination. The program instructions recorded on the medium may be specifically designed for the present invention or may be well known to one of ordinary skill in the art of software. Examples of the computer-readable recording medium include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device described above may be constructed so as to operate as one or more software modules for performing the operations of the embodiments of the present invention, and vice versa.

Although the present invention has been described with reference to the specific embodiments and drawings together with specific details such as detailed components, the above description is provided only for better understanding of the present invention and it will be apparent to those skilled in the art that various modifications and variations may be made from the above description.

While embodiments have been disclosed herein, it should be understood that other variations may be possible. Such variations are not to be regarded as a departure from the spirit and scope of embodiments of the present application, and all such modifications as would be obvious to one skilled in the art are intended to be included within the scope of the following claims.

What is claimed is:

1. A mobile communication terminal comprising:
a display;
a camera; and
a button located outside the display;
wherein the terminal is configured to switch from an inactive state to an active state in response to a press of the button while the terminal is in the inactive state,
wherein the inactive state is defined as the terminal is communicable and the display is being turned off,
wherein the active state is defined as the terminal is communicable and the display is being turned on, wherein upon receiving the press of the button while the terminal is in the inactive state, the terminal is further configured to perform a hands-free function in response to the button being pressed once for a time period which is greater than or equal to a first threshold time period; and wherein upon receiving the press of the button while the terminal is in the inactive state, the terminal is further configured to activate the camera in response to the button being pressed again within a second threshold time period from the previous press of the button.

2. The mobile communication terminal according to claim 1, wherein the camera is located on a side of the terminal on which the display is not located.

3. The mobile communication terminal according to claim 1, wherein the camera is located on the same side of the terminal as the display.

4. The mobile communication terminal according to claim 1, wherein when the camera is activated in response to the button being pressed again while the terminal is in the inactive state, a screen captured by the camera is displayed on the display.

5. The mobile communication terminal according to claim 4, wherein when the camera is activated in response to the button being pressed again while the terminal is in the inactive state, an unlock interface is further displayed on the display.

6. The mobile communication terminal according to claim 1, wherein the first threshold time period is different from the second threshold time period.

* * * * *